(12) United States Patent
Burnett et al.

(10) Patent No.: US 10,930,107 B2
(45) Date of Patent: Feb. 23, 2021

(54) VENDING MECHANISM

(71) Applicant: The Coca-Cola Company, Atlanta, GA (US)

(72) Inventors: Clayton Burnett, Atlanta, GA (US); Lee Alan Hawkins, Atlanta, GA (US); John Boyd, Atlanta, GA (US); Thomas G. North, III, Atlanta, GA (US); Chih-Shang Fu, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 16/098,388

(22) PCT Filed: May 2, 2017

(86) PCT No.: PCT/US2017/030643
§ 371 (c)(1),
(2) Date: Nov. 1, 2018

(87) PCT Pub. No.: WO2017/192591
PCT Pub. Date: Nov. 9, 2017

(65) Prior Publication Data
US 2019/0172295 A1  Jun. 6, 2019

Related U.S. Application Data

(60) Provisional application No. 62/330,731, filed on May 2, 2016.

(51) Int. Cl.
*G07F 11/34* (2006.01)
*G05B 19/042* (2006.01)

(52) U.S. Cl.
CPC ............ *G07F 11/34* (2013.01); *G05B 19/042* (2013.01)

(58) Field of Classification Search
CPC .............................. G07F 11/34; G05B 19/042
(Continued)

(56) References Cited

U.S. PATENT DOCUMENTS 1,606,679 A * 11/1926 Wagner ................. F25D 25/025
 221/97
3,141,571 A *  7/1964 Moore ..................... G07F 11/34
 221/195

(Continued)

FOREIGN PATENT DOCUMENTS

EP  2679940 A2  1/2014
WO  2004017268 A2  2/2004

OTHER PUBLICATIONS

International Search Report corresponding to PCT/US2017/030643, dated Sep. 13, 2017, 10 pages.
(Continued)

*Primary Examiner* — Michael Collins
(74) *Attorney, Agent, or Firm* — Foley & Lardner LLP

(57) ABSTRACT

A system and method of vending product items may include storing product items within a product storage area. A product item may be released from the product storage area. The product item may be hoisted over at least a portion of the product storage area. The hoisted product item may be presented to a user. In one embodiment, the product storage area may be positioned within a vending machine, and the vending machine may be mobile. The vending machine may also be self-propelled. In an embodiment, the vending machine may be moved via a controller being used by an operator. Alternatively, the vending machine may be moved autonomously.

10 Claims, 19 Drawing Sheets

(58) Field of Classification Search
USPC .................................................. 700/231–244
See application file for complete search history.

(56) References Cited

U.S. PATENT DOCUMENTS

| | | | |
|---|---|---|---|
| 3,348,733 A | 10/1967 | Johnson | |
| 4,456,147 A * | 6/1984 | Tominaga | G07F 11/34 221/67 |
| 4,986,441 A * | 1/1991 | Kanbe | G07F 11/58 221/130 |
| 6,247,610 B1 * | 6/2001 | Ziesel | G07F 9/02 221/119 |
| 7,228,989 B2 * | 6/2007 | Bhatti | F25B 5/02 221/150 R |
| 8,261,940 B2 * | 9/2012 | Pfister | G07F 11/04 221/123 |
| 9,292,994 B2 * | 3/2016 | Rose, Jr. | G07F 11/30 |
| 2002/0125263 A1 | 9/2002 | Credle et al. | |
| 2004/0140317 A1 * | 7/2004 | Forte | G07F 11/32 221/123 |
| 2008/0011771 A1 * | 1/2008 | Roekens | G07F 11/24 221/253 |
| 2008/0245820 A1 * | 10/2008 | Pfister | G07F 11/04 221/1 |
| 2010/0100241 A1 * | 4/2010 | Jarisch | B25J 11/00 700/259 |
| 2012/0000744 A1 * | 1/2012 | Roekens | G07F 9/105 194/350 |
| 2014/0277136 A1 * | 9/2014 | Stein | G06Q 10/087 606/240 |
| 2016/0355337 A1 * | 12/2016 | Lert | B65G 1/0492 |
| 2017/0011580 A1 * | 1/2017 | Huang | G06Q 10/30 |

OTHER PUBLICATIONS

Extended European Search Report corresponding to Europe Application No. 17793163.1, dated Jan. 2, 2020, 6 pages.

* cited by examiner

VENDING MECHANISM

REFERENCE TO RELATED APPLICATION

This application is a 371 National Stage application of International Application No. PCT/US2017/030643, filed May 2, 2017, which claims the benefit of U.S. Provisional Application No. 62/330,731, filed May 2, 2016, each of which is herein incorporated by reference in its entirety.

BACKGROUND OF THE INVENTION

Vending machines are equipment used to dispense products, such as foods and beverages, to people who want to conveniently purchase products. Conventional vending machines come in many different designs, but are typically rectangular in shape with rows or columns of product items. As an example, in the event of a beverage company using a vending machine to deliver beverages to customers, one or more beverage type is loaded into the vending machines, and made available for selection by a user for purchase via a user interface.

Vending machines have a variety of different vending mechanisms, including rows with screw mechanisms for dispensing one product item at a time, columns with screw mechanisms for dispensing one product item at a time, rows with robotic selector arms that select a product item, vertical elevators that lift product items from a bottom position to an upper position to deliver a product item to a user, and so forth. These vending machines are generally fixedly positioned and weigh a significant amount due to the weight of the product items, refrigeration units, and overall mass of the vending machines.

SUMMARY OF THE INVENTION

To provide for a vending machine that has sufficient product storage space, a product storage area with angled walls having a wider base than top may be utilized. The vending machine may be self-propelled, mobile, and have a robotic (e.g., humanoid, with or without arms) appearance. In one embodiment, the product storage area may include a product storage serpentine that enables product items to be gravitationally guided and into an elevator shaft so that an elevator mechanism inclusive of a cradle or otherwise configured may be used to hoist a product item upward and dispensed into a dispenser area for a user to receive. The product items may be beverages, food products (e.g., snacks), promotional items, tickets, messages, or otherwise, and include containers that have a circular shape so that the product items may roll as a function of gravity within the product storage serpentine.

One embodiment of a vending machine may include a housing and a product storage area in which product items to be dispensed by the vending machine are stored. An elevator shaft may be positioned adjacent to the product storage area, and have an acute angle relative to a base and towards the product storage area. An elevator member, such as a cradle, may be configured to hoist a product item along the elevator shaft. A drive mechanism, such as a motor, may be configured to cause the elevator member to move from a first position to a second position along the elevator shaft to hoist the product item. An opening may be defined by the housing, and be configured to enable the product item to be received by a user.

One embodiment of a method of vending product items may include storing product items within a product storage area. A product item may be released from the product storage area. The product item may be hoisted over at least a portion of the product storage area. The hoisted product item may be presented to a user.

One embodiment of a vending machine may include a product storage area and at least one sensor configured to capture data of a user. The vending machine may further include a processing unit in communication with the sensor (s), and be configured to (i) process the captured data to determine if the user performs a physical action, and, responsive to determining that the user performs a physical action, cause the vending machine to perform an action.

BRIEF DESCRIPTION OF THE FIGURES

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 3A:
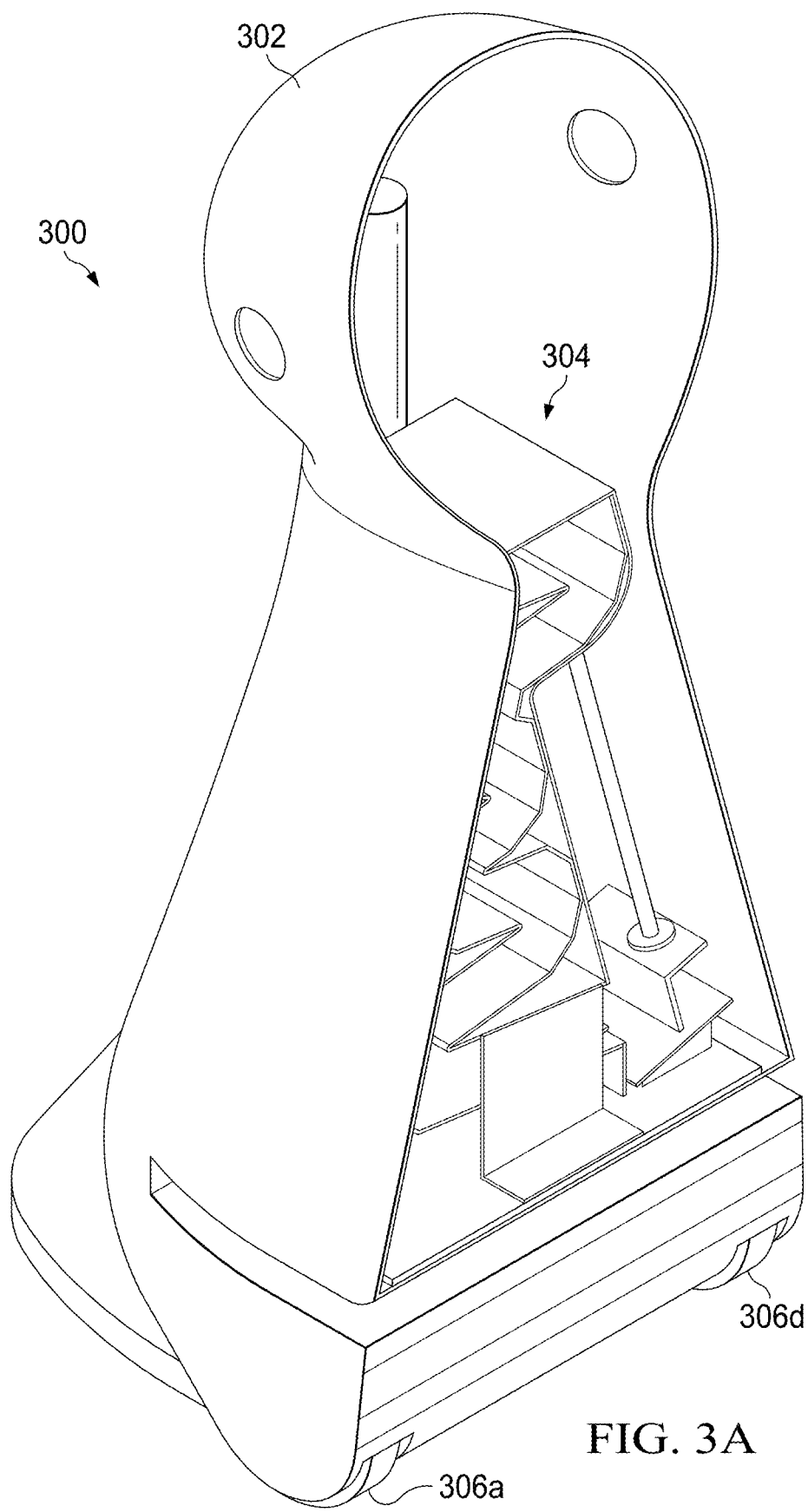
FIGS. 3A-3D are illustrations of an illustrative vending machine inclusive of a vending mechanism.
Figure 3B:
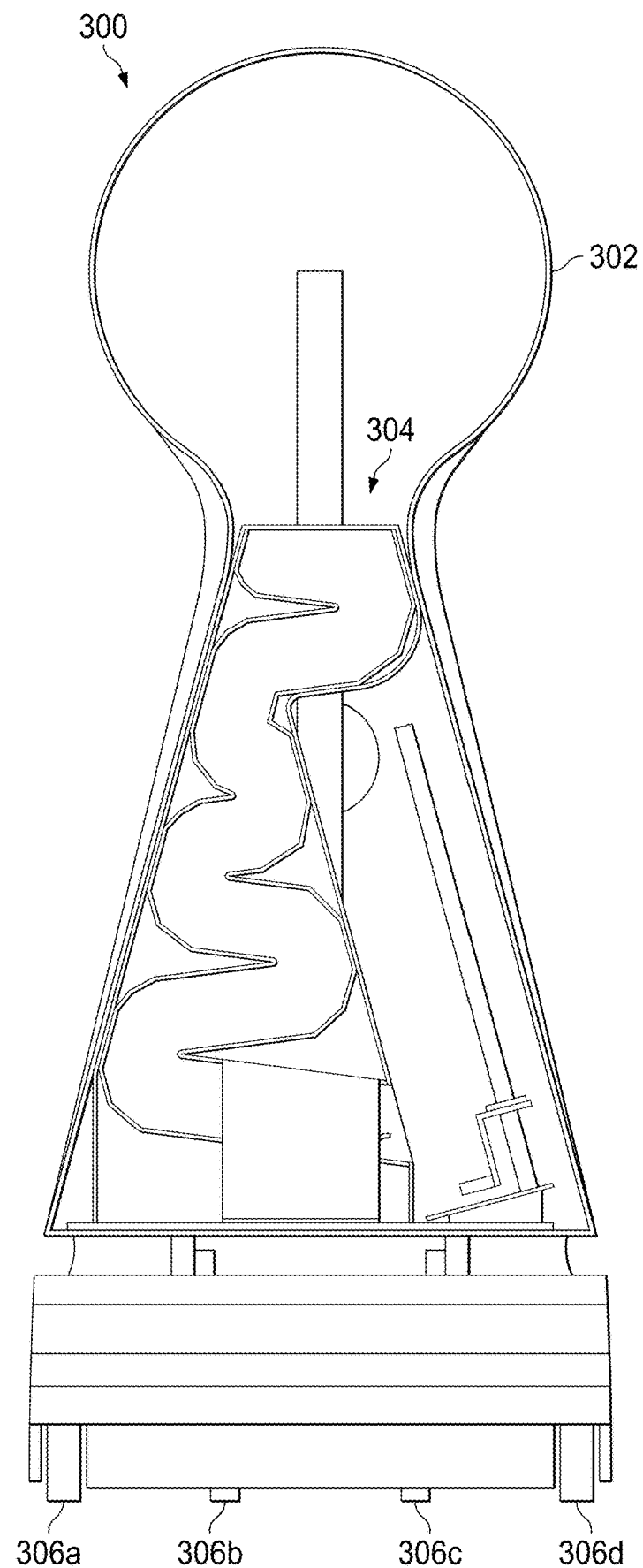
Figure 3C:
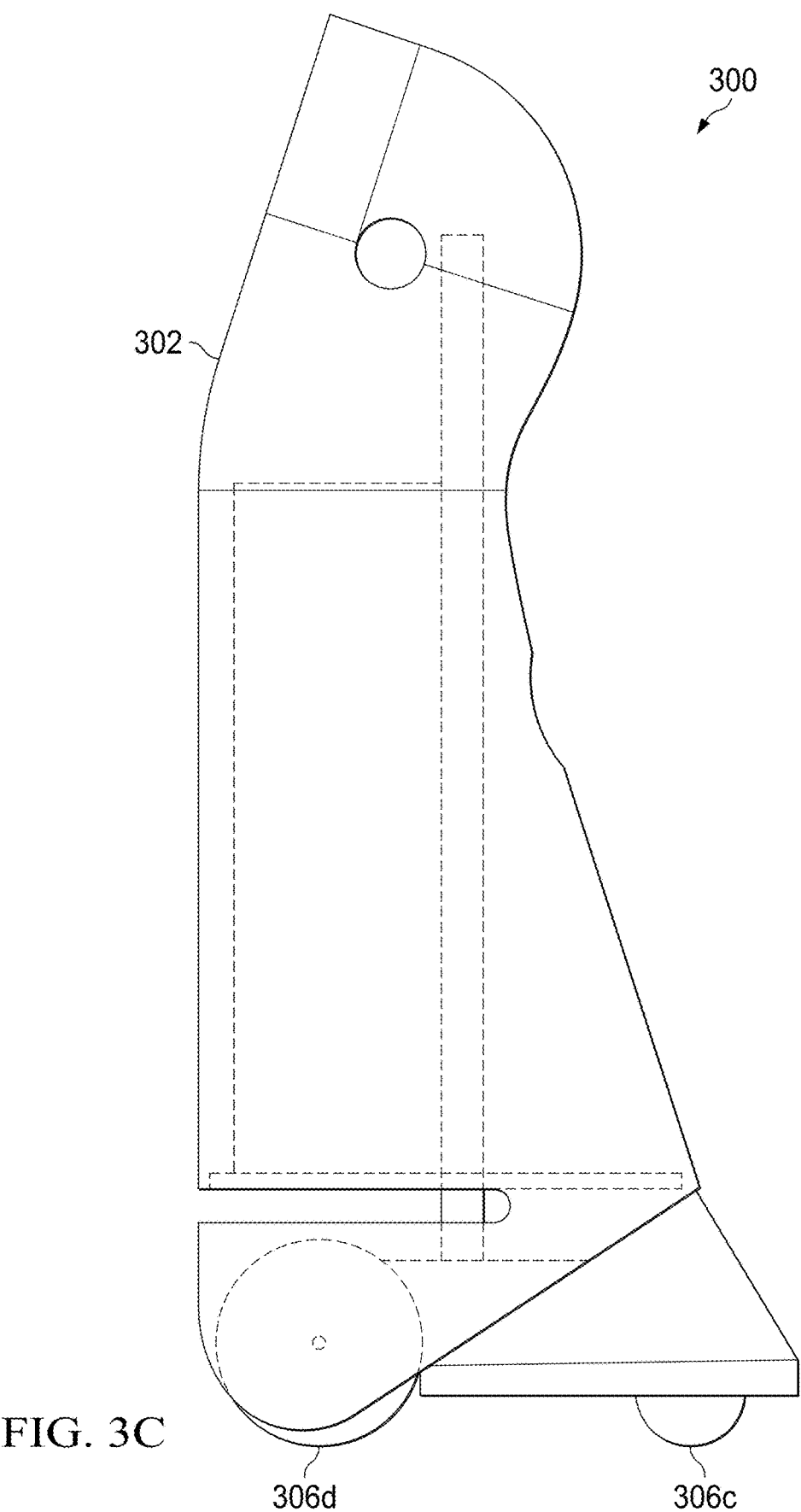
Figure 3D:
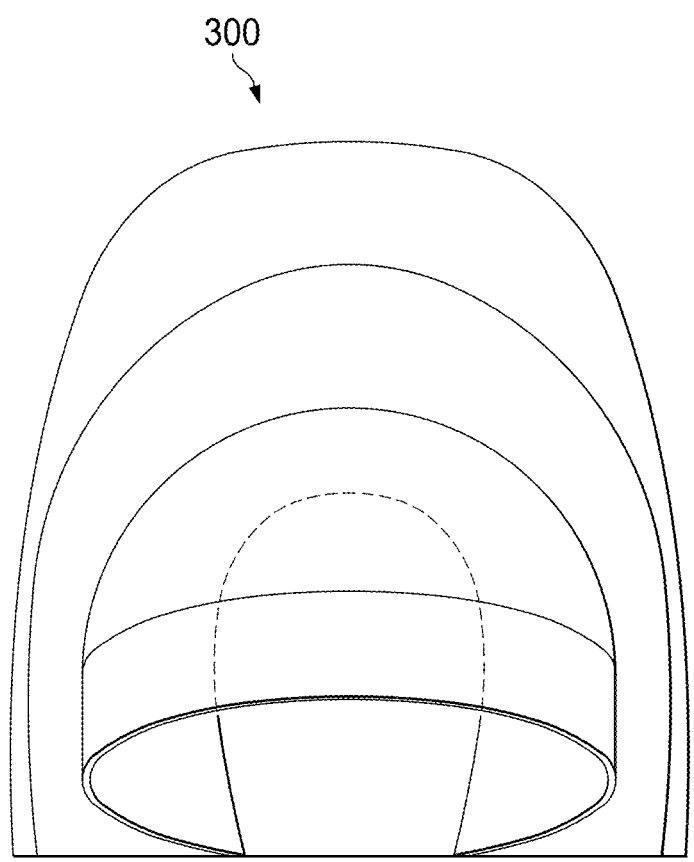

With regard to FIG. 1, an illustration of an illustrative vending machine 100a configured in the shape of a humanoid robot capable of being self-propelled is shown. The vending machine 100a, of course, may have any other shape and/or appearance. The vending machine 100a, in being self-propelled, may be self-propelled through use of a drive mechanism (not shown), such as a motor, that causes one or more wheel (see FIG. 3B) or other elements (e.g., tank tracks) to cause the vending machine 100a to move along a floor or otherwise. The motor may be an electric motor, such as a direct drive motor, or any other motor or power conversion device, as understood in the art, that causes a wheel or other mechanism to propel the vending machine 100a forward. Although described as a vending machine, the vending machine 100a may operate in a dispensing mode to dispense product items without a financial transaction occurring (i.e., provide free products or promotional giveaways). The vending machine 100a may be used indoors or outdoors, and a drive mechanism and wheels or other elements may be properly sized and powered to accommodate different environments in which the vending machine 100a may be operated.

Figure 1A:
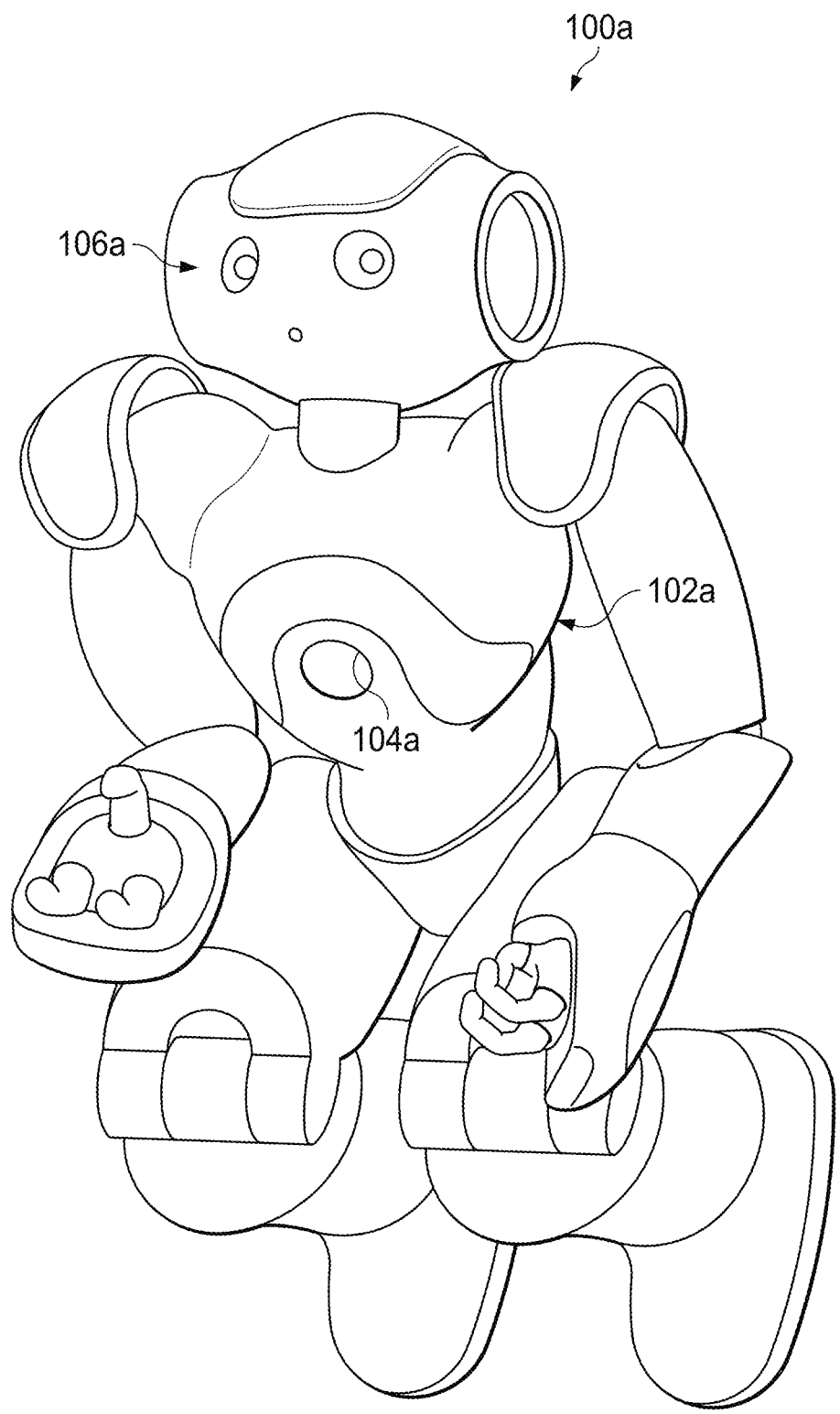
FIG. 1A is an illustration of an illustrative vending machine shaped as a humanoid robot capable of being self-propelled.
Figure 1B:
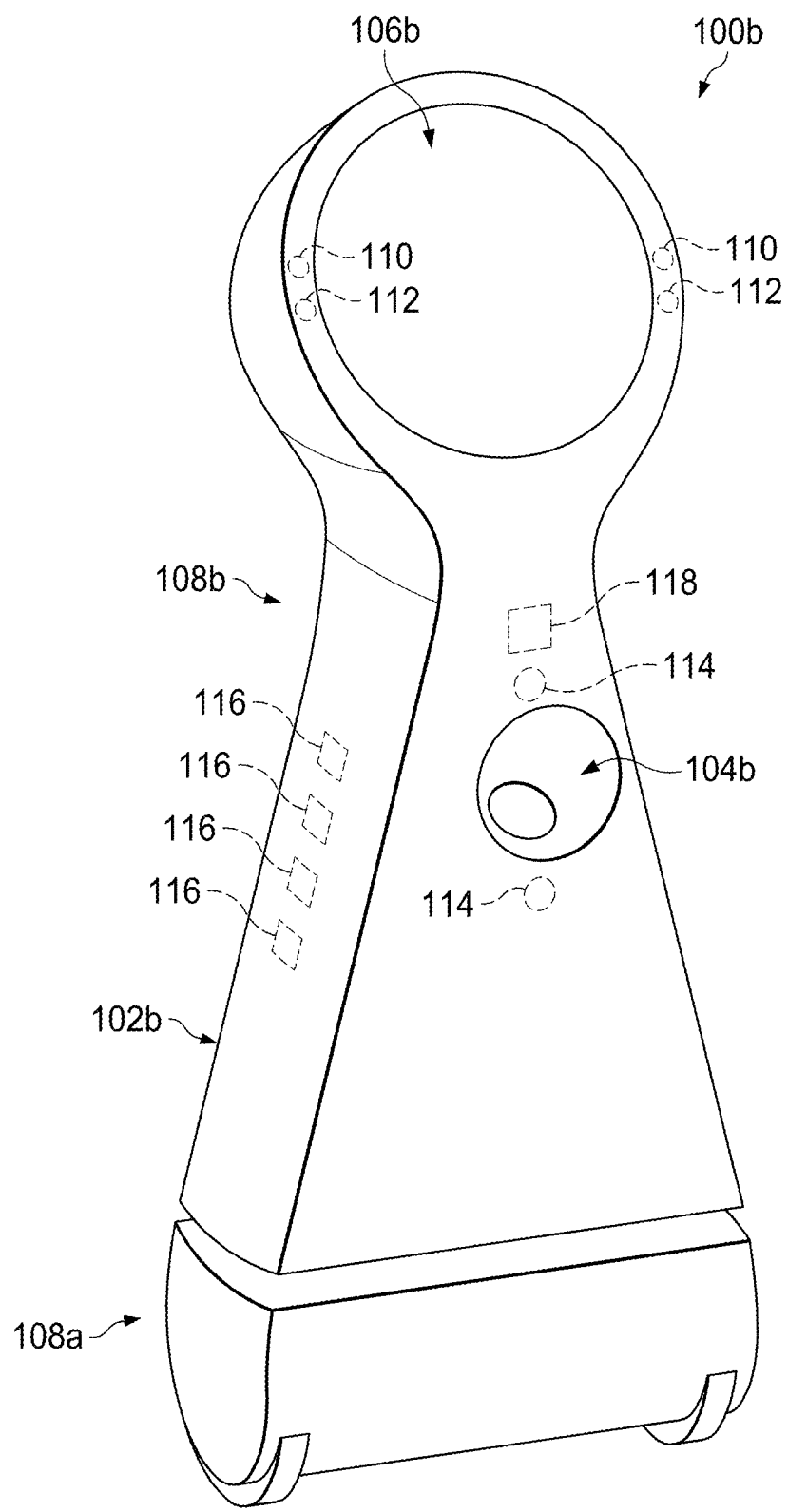
FIG. 1B is an alternative embodiment of an illustrative vending machine shaped with a robotic appearance.
Figure 2A:
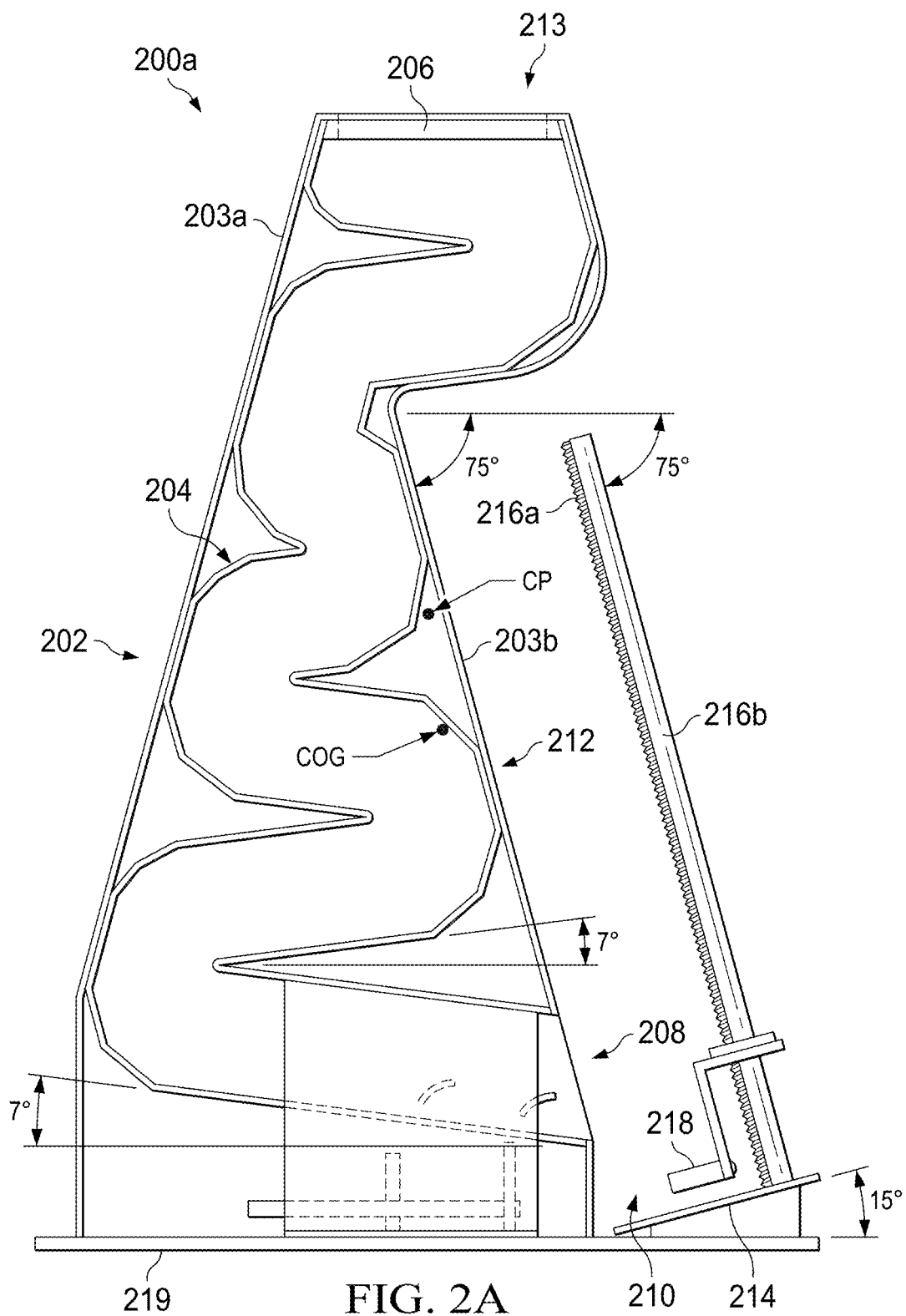
FIG. 2A is an illustration of a front view of an illustrative vending mechanism configured to be positioned within a vending machine, and shaped to maximize space and flow of product items to be dispensed to a user of the vending machine.

The vending machine 100a, when shaped as a humanoid, has limited storage capacity for products, such as food or beverage items, within a product storage area (see FIG. 2A). As an example, the vending machine 100a may have a storage capacity of 4-6 beverage cans. The reason for the limited storage capacity is, in part, due to the narrow or tapered body portion 102a. Other products, such as promotional items (e.g., fast pass to rides), toys, vouchers, stuffed animals, coupons, messages (e.g., jokes), and so on, may also be vended by the vending machine 100a or 100b (see FIG. 1B), as further described herein. To enable the other products to be more easily dispensable, the products may be placed in a container with at least a portion (e.g., circumference) of the container being circular so that the container can roll due to gravitational forces through the vending machine, as further described herein. Alternative designs may be utilized to provide for the same vertical travel functionality to be possible. For example, carriages on tracks, rails, or otherwise on which products may be placed to be dispensed utilizing gravitational forces may be utilized.

In addition to the limited capacity, because the body portion 102a is in the shape of a humanoid body (e.g., chest, stomach, and/or legs), the product storage area has a high center-of-gravity. Thus, to expand product storage capacity and lower the center-of-gravity, the shape of the vending machine 102a may be altered to be wider at the base, such as shown in FIG. 1B, and include a diagonal elevator shaft to provide an efficient use of space within the body portion 102a. A dispensing area 104a located in the center of the body portion 102a of the vending machine 100a may enable a user to receive the product items from the vending machine 100a. In this case, the dispensing area 104a is circular, has a downward angle (e.g., 45 degrees), and is centrally positioned. However, it should be understood that any shape (e.g., heart shape) and configuration of a dispensing area 104a may be utilized for providing product items to users. In an alternative embodiment, the dispensing area 104a may be repositioned to be in another location of the vending machine 100a. For example, the dispensing area 104a may be repositioned to be at the head (e.g., mouth) or hand. The vending machine 100a is shown to include a top portion 106a, which in this case is a head with a face. If the vending machine 100a had a different shape, such as a tree, the top portion may have a different shape (e.g., branches and leaves, cartoon character, etc.). So as to maintain a lower center-of-gravity to reduce the risk of the vending machine 100a tipping over and improving mobility, the top portion 106a may be lightweight.

Although not shown, one or more user interface elements (not shown), such as buttons, electronic displays, or otherwise, may be provided on the vending machine 100a to enable a user to interact with the vending machine 100a to select and/or pay for products. The user interface may be located anywhere on the vending machine 100a. In one embodiment, the user interface may be provided or otherwise be available via an electronic device (e.g., smartphone via the Internet), and the vending machine 100a may include a wireless device that enables the user to interact specifically with the vending machine 100a to make his or her selection and/or pay for a selected product. Payment may be performed using a credit card, online account (e.g., PayPal®), cash, coins, or any other form of payment locally or remotely.

With regard to FIG. 1B, an alternative embodiment of an illustrative vending machine 100b is shown. This vending machine 100b is less humanoid in appearance, and is configured to have a larger storage capacity (e.g., 20+ beverage cans) and a lower center-of-gravity with more product capacity by having a wider lower region 108a than upper region 108b. In one embodiment, a product storage area may be positioned within the vending machine 100b, and the vending machine 100b may be mobile. The vending machine 100b may also be self-propelled. In an embodiment, the vending machine 100b may be moved via a controller, wired or wireless, with a user interface being used by an operator. Alternatively, the vending machine 100b may be moved autonomously, such as the vending machine 100b tracking a wireless device, object, individual, or otherwise using one or more sensors (e.g., image, RF, IR, UV, etc.) and a processing unit to cause movement of the vending machine 100b.

The housing 102b, as shown, is configured to be triangular and symmetric. It should be understood that alternative configurations, such as semi-spherical, stacked spheres or sphere portions (e.g., snowman shape), trapezoidal, or otherwise (e.g., non-symmetric), may be utilized. A dispensing area 104b is shown to be offset to where a heart may be located, and be positionally more accessible to dispense products stored in the vending machine 100b due to having an elevator or lift positioned adjacent to or beside the product storage area, as further described herein. The dispensing area 104b is shown to be circular, but non-circular (e.g., heart shaped) or dynamically shaped (e.g., mouth that opens and closes) configurations may be utilized, as well. A sensor may be located at the dispensing area 104b to sense that a product item is removed therefrom prior to dispensing another product item.

In one embodiment, the housing 102b may be configured to form fit the dispensing area 104b so that a profile of the housing 102b is minimized. In such an embodiment, the dispensing area 104b may be configured without a refrigerator or heater unit so that the product items are maintained at ambient temperature. In an alternative embodiment, a refrigerator unit (not shown) may be positioned within the housing 102b to maintain a cool temperature, such as desirable for beverages. In yet another embodiment, a heater unit (not shown) may be positioned within the housing 102b to maintain an elevated temperature, such as desirable for warm food. In yet another embodiment, both a refrigerator unit and heater unit, optionally configured as a single unit, may be positioned within the housing 102b. Still yet, a refrigerator unit and/or heater unit may be located outside the housing 102b. If a refrigerator unit and/or heater unit were used, then the housing 102b and/or dispensing area 104b may be insulated to maintain a constant temperature. The vending machine 100b may be configured with a battery (not shown), uninterruptable power supply (not shown), or wall powered.

A head region 106b is shown to be representative of a head and face, but in this case, rather than having a humanoid face, face region is shown to be blank (e.g., flat, translucent panel). In alternative embodiments, indicia representative of facial features may be included. Still yet, the face region may be blank or translucent, but include an electronic display of LEDs behind a translucent panel, LCDs as the panel that forms the face, or any other electronic display for use in displaying images, messages, text, or any other information to provide for entertainment, information, payment, or otherwise. In one embodiment, speakers or any other device for communicating information, entertainment (e.g., music), or feelings (e.g., happy, sad, excited, melancholy, inquisitive, etc.), for example, to the user may be configured as part of the vending machine 100b. Still yet, the face may provide for a user interface to provide for vending operations (e.g., select product item, pay for product item, etc.). Mechanical buttons or user interface elements may also be available on the vending machine 100b to cause a product item to be dispensed.

While the vending machine 100b does not specifically appear to be a humanoid, certain humanoid functions may be integrated into the vending machine 100b. As an example, the vending machine 100b may have a human expression and/or action reading function(s) integrated therein. In order to support the human expression or action reading function, sensors, including at least one of one or more cameras 110, microphones 112, presence sensors (e.g., proximity, pressure, contact, ultrasound, light, radar, etc.) sensors 114 and 116 may be utilized. The sensors 114 and 116 may be the same or different types. The cameras 110 may be used to image, either in a static photograph or video, a person engaging with the vending machine 100b, and operate in a 2D or 3D (stereoscopic) manner. The microphones 112 may be used to listen to audio from a user (e.g., request for a beverage), as well as an operator or handler of the vending machine 100b (e.g., to listen for verbal or other audible commands).

A voice recognition system may be configured to recognize a voice of an operator using formant, pitch, cadence, pattern matching, or other analysis, thereby only responding to commands by approved operators. In some embodiments, the sensors 114 may include transmitter/receiver pairs that are capable of (i) transmitting RF or other wavelength signals and (ii) receiving reflected signals from a person in front of or otherwise positioned relative to the vending machine 104. The sensors 116, which may also extend along the opposite side of the vending machine 100b, may include pressure sensors and/or light sensors to sense hands or arms, for example, pressing or covering the sensors 116. It is noted that the sensors 114 and/or 116 may be positioned at a height and location to image or otherwise sense a child and/or adult so as to identify the category of user of the vending machine 100b.

To support the functionality, computer processing may be integrated into the vending machine 100b. The computer processing may include a processing unit, which may include a general processor, image processor, audio processor, signal processor, and/or any other specialized processing device and/or electronics along with specific algorithms. The processor(s) may be configured to manage sensed signals from one or more sensors and perform image, audio, or other processing. As an example, a "facial emotion expression" (such as smile from a user) may trigger dispensing a product item. An another example, an "emotion action," such as a hug from a child, may trigger the dispensing of a product item, optionally at a reduced cost or free of charge. That is, a combination of sensing and signal processing may enable operation of the vending machine 100b to be operated by touch or non-touch by a user to cause some level of consideration to be valued by the vending machine (e.g., verbal "please" and "thank you" is worth 50.50 discount, verbal password is worth a free beverage, smile is worth 50.25 discount, speaking "ABCs" is worth 50.25, waving is worth 50.25, hug is worth 50.50, etc.).

Figure 1C:
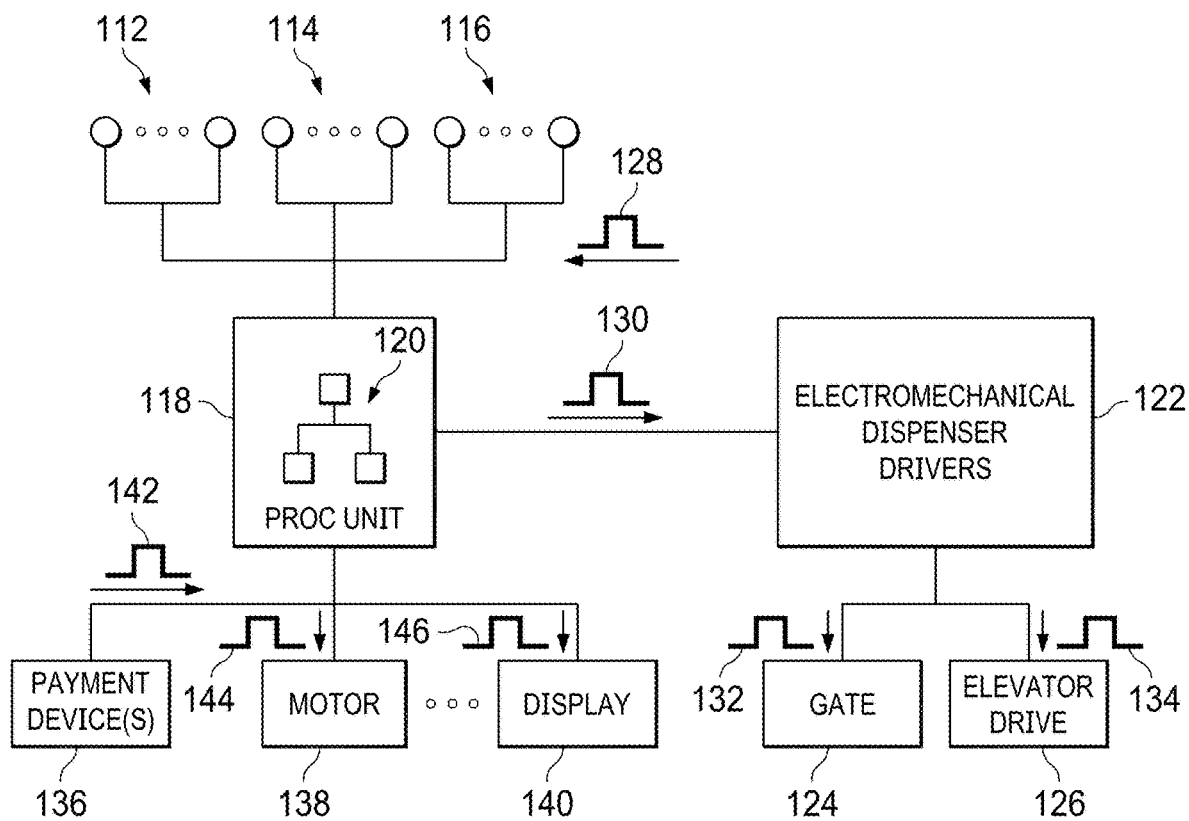
FIG. 1C is a schematic of illustrative circuit elements shows the sensors to be in electrical communication with the processing unit.

With regard to FIG. 1C, a schematic of illustrative circuit elements shows the sensors 112, 114, and 116 to be in electrical communication with the processing unit 118. The processing unit 118, which may include one or more computer and/or signal processors, executes software 120 that is configured to determine visible, audible, and/or physical, both touch and non-touch, gestures by a user. A touch pad, touch screen, or other device (not shown), may be positioned on the vending machine 100b may enable a user to provide for gestures, such as drawing a smiley face. In one embodiment, one or more touch sensor (e.g., capacitive sensor, pressure sensor, etc.) or proximity sensor, as understood in the art, may be configured to determine that the user touches one or more portions of the vending machine 100b. As an example, the vending machine 100b may be configured to sense via touch and/or proximity sensor(s) in communication with the processing unit 118 that a user shakes a hand, rubs a tummy, pats on the back, or otherwise physically interfaces with the vending machine 100b in an appropriate manner (e.g., soft or courteous touches as opposed to slapping or hitting).

One or more electromechanical dispenser drivers 122 may be in communication with the processing unit 118, and be configured to drive electromechanical devices, such as a gate 124 that is configured to release one or more product items into an elevator shaft such that an elevator drive 126 may lift the product item(s) for dispensing to the user. Again, rather than using an elevator, alternative electromechanical mechanisms may be utilized to perform the vending function, as further described herein.

In operation, responsive to one or more of the sensors 116 sensing a user hugging the vending machine 100b through physical touch or light sensing, sensor signal(s) 128 may be communicated from the sensor(s) 116 to the processing unit 118 for processing. The processing unit 118, in determining that the user performed a certain action by processing the sensor signals 128, may provide for a discount or take a particular action (e.g., enable vending, provide free beverage, etc.) along with issuing a command to the electromechanical dispenser drivers 122 that, in response, generate drive signals 132 and 134 that are coordinated to cause the gate 124 to release a product item into the elevator shaft and to cause the elevator drive 126 (e.g., motor) to lift a cradle used to lift the product item to a dispensing area for the user to receive his or her product item. Moreover, the processing unit 120 may cause the vending machine 100b to generate an audible sound, such as a simple "thank you," "clapping sound," "whistle," or other audible sound, to cause the vending machine to autonomously move, such as spin in a circle, shift side-to-side, move forward and backward, move a "body part," such its head, arm(s), fingers, or otherwise, turn on light(s), display a message, or perform any other action to communicate an emotion, sentiment, notification, or message to the user.

The processing unit 118 may further be in communication with (i) payment device(s) 136 that enable a user to pay for product items, (ii) motor 138 that may be used for moving the vending machine 100b, and user interface 140 that enables the vending machine to communicate visually, audibly, or otherwise with the user. In response to a user using one of the payment devices 136, such as a card reader, near field communication (NFC) device, cash reader, or otherwise, the vending machine may communicate a signal 142 to the processing unit 118 that, in response, determines that sufficient money or credit (e.g., coupon or promotional code) has been tendered. The vending machine 100b may utilize a wireless link for communicating card information to a remote server to confirm that a credit, debit, or prepaid card of a user has sufficient balance to pay for a product item, as understood in the art.

Responsive to payment being made, the processing unit 118 may cause the product item to be dispensed and drive the motor 138 with signal 144 to move the vending machine 100b in a particular pattern, randomly, or otherwise, if desired, to show appreciation for the purchase. Additionally, the processing unit 118 may communicate a signal 146 to the user interface 140 to display information, play audio, cause a vibration, or perform any other sensory communication of which the user interface is capable. As an example, the user interface 140 may include LEDs at the face 106b of the vending machine 100b, and a message, such as "enjoy your drink," may be displayed for the user. In an alternative embodiment, a graphic, image, video, facial expression, or otherwise may be displayed to the face 106b.

Figure 1D:
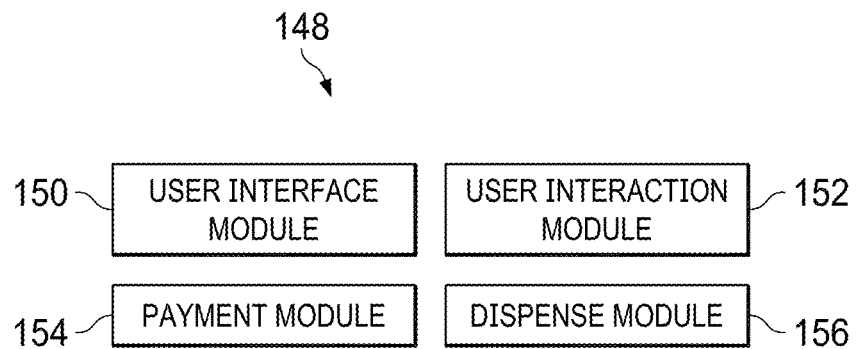
FIG. 1D is a block diagram inclusive of illustrative software modules that may form part of the software of FIG. 1C to enable a user to interface with the vending machine and to operate the vending machine of FIG. 1B.

With regard to FIG. 1D, a block diagram inclusive of illustrative software modules 148 that may form part of the software 120 of FIG. 1C to enable a user to interface with the vending machine and to operate the vending machine 106b of FIG. 1B is shown. The modules 148 may include a user interface module 150 that supports a user interface, such as a touchscreen, keypads, buttons, or any other user interface elements. A user interaction module 152 may include executing an interactive voice response (IVR) system on the processing unit 118 that enables a user to speak commands to the vending machine 100b. The commands may include, "purchase a product," "how much does a product cost?" "what flavors are available" or any other user interactive command. Since the vending machine 100b may be self-propelled, the commands may include movement commands, such as "spin," "dance," "smile," or any other command. In that regard, the processing unit 118 may be configured to drive at least one wheel and/or rotate at least one wheel, thereby self-propelling and driving the vending machine 100b in one or more directions. A payment module 154 may enable a user to pay for a product item. The payment module 154 may support payment using conventional payment mechanisms, along with supporting discounting or giveaways based on the user interaction.

The user interaction module 152 may be configured to receive and process images, touch signals, audio signals, or any other signals measured by sensors 112, 114, and/or 116, as described with regard to FIG. 1B, and provide a discount amount to the payment module 154 for discounting, setting a price, issuing a free-of-charge product item, or providing any other value by the vending machine. A dispense module 156 may be configured to dispense a product item in response to payment or other value based on the user interaction module 152 determining that the user spoke or gestured an action (e.g., wave, smile, hug, spin, dance, blink, say "hello," say "I like your smile," or speak or gesture anything else) that is determined by the user interaction module 152 to be worth some value.

Figure 1E:
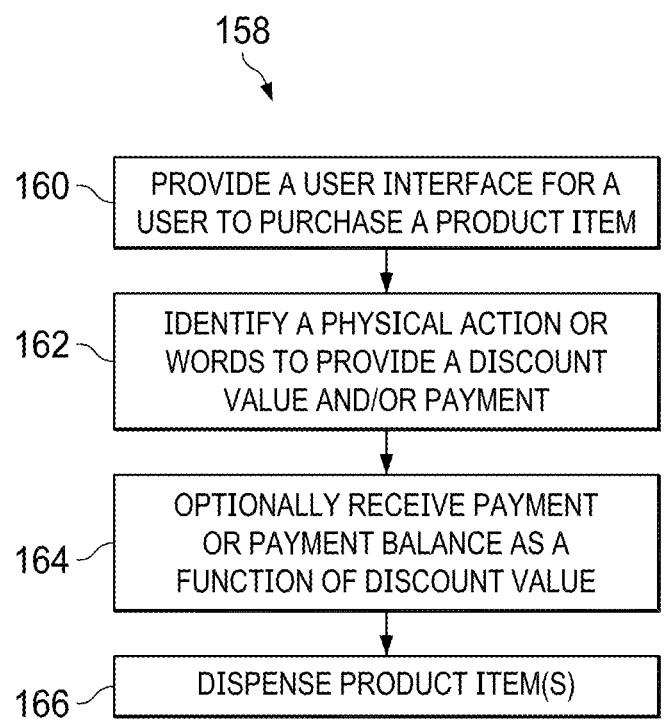
FIG. 1E is an illustrative flow diagram for an illustrative process for providing vending of product items from a vending machine, such as, but not limited to, the vending machine of FIG. 1B.

With regard to FIG. 1E, an illustrative flow diagram for an illustrative process 158 for providing vending of product items from a vending machine, such as, but not limited to, the vending machine of FIG. 1B is shown. The process 158 may start at step 160, where a user interface may be provided to a user to purchase a product item. The user interface may be physically represented on the vending machine (e.g., card reader, bill reader, coin reader, NFC reader, code reader, etc.) or may be embedded within the vending machine (e.g., voice recognition system, scanner, or otherwise). In one embodiment, the user interface may include a wireless feature that may enable a user to use a local (e.g., Bluetooth) or long distance (e.g., mobile network) to purchase a product item from the vending machine. In one embodiment, a network server may receive an order for a product item, and the vending machine may be commanded to dispatch a product item.

At step 162, a physical action or words may be identified to provide a discount value and/or payment. In identifying the physical action or words, a camera or other sensor may be used to image or sense physical characteristics and/or motions of a user. A processing unit that performs signal processing, such as image processing, voice recognition, audio recognition, etc., may be used to determine whether the user performs a physical action (e.g., smiles, waves, laughs, says a word or phrase, or performs any other motion or gesture) that merits providing the user with a discount or free product item to offset payment for the product item. The image processing may utilize shape and/or pattern recognition to identify a specific physical action, such as a wave or smile. The vending machine may utilize a timer to determine whether the user performs an action in a predetermined time, such as 5 seconds, and, if the user does not perform a requested action, cancels a potential discount award for the user. In one embodiment, at step 164, payment or payment balance (e.g., full price minus offset due to performing an action) may optionally be received as a function of discount value. At step 166, one or more product items may be dispensed by the vending machine, as further described herein.

With regard to FIG. 2A, an illustration of a front view of an illustrative vending mechanism 200a configured to be positioned within a vending machine, such as a self-propelled vending machine, and shaped to maximize space and flow of products (e.g., food or beverages) to be vended to a user of the vending machine is shown. The vending mechanism 200a may include a product storage area 202 in which a product storage serpentine 204 traverses. As shown, the product storage area 202 has a triangular shape defined by walls 203a and 203b (collectively 203) in which a bottom area is wider than a top area. The triangular-like shape (i.e., shape that is not a triangle per se, but has certain triangular characteristics) of the product storage area 202 lowers a center-of-gravity of a vending machine in which the vending mechanism 202a is positioned. Alternative configurations that fit within a housing of the vending machine and provide for high-capacity may be utilized. In one embodiment, the walls 203 may be angled at approximately 75 degrees (e.g., 74-76 degrees). Alternative angles may be utilized, but the higher the angle, the less stable a vending machine will be, and the lower the angle, the wider the vending machine will be so a design tradeoff is to be made based on deployment location criteria.

Varying the width relative to the height may provide for configurations of the vending mechanism that may increase or decrease the product capacity of the vending machine along with the configuration of the product storage serpentine 204. A center point (CP) of the product storage area 202 is shown to be above a center-of-gravity (COG), which shows how using a triangular configuration or other expanded lower region for the product storage area 202 lowers the center-of-gravity for the product storage area 202 and a vending machine in which the product storage area 202 is positioned. Although lowering the center-of-gravity in the product storage area 202 reduces the potential for the vending machine in which the vending mechanism from tipping while maximizing storage capacity, it is conceivable that a higher center-of-gravity of the vending mechanism 200a is possible while still achieving the functionality of maximizing product storage area by including other features in the vending machine to lower the center-of-gravity.

As shown, the product storage serpentine 204 may have a top opening 206 through which products may be loaded into the product stores serpentine 204, and the products may be lowered or guided along the product storage serpentine 204 as a function of gravity (i.e., gravitationally guiding or propelling product items along the product storage serpentine 204). Alternatively, the product storage serpentine 204 may have a closed top without an opening. The product store serpentine 204 may be sized in length, width, and height to accommodate a beverage can (e.g., 12 ounce soda or beer can), bottle (e.g., 20 ounce bottles). For vending non-beverage containers (e.g., food, snacks, promotional items, etc.) or beverage containers with non-circular shapes, a container sized and shaped to fit within the product store serpentine 204 may be used to encapsulate such product items. The product storage serpentine 204 may have rounded or angled corners, and straight sections may have downward (e.g., 3-7 degrees) so that product that is disposed within the product storage serpentine 204 may be gravitationally lowered or guided (e.g., rolled) from top to bottom to minimize potential of products becoming jammed or otherwise to not automatically pass through an exit 208 from the product storage serpentine 204 into an elevator shaft 210. The product storage serpentine 204 may have an outer surface 212 that, at least in one portion, contacts or shares a wall 203b of the product storage area 202. The wall 203b may also be a wall that, in part, defines the elevator shaft 210. The product storage serpentine 204 may extend between the walls 203a and 203b to provide maximum capacity for product items disposed therein. To provide for additional capacity, a portion 213 of the product storage serpentine 204 may extend over the elevator shaft 210. In an embodiment, the product storage area 202 and elevator shaft 210 may be formed as a single, modular unit that can be removed from one vending machine and placed into another vending machine, thereby making assembly and repair easier.

The elevator shaft 210 may include a base 214 that is normal to wall 203b, in this case 15 degrees. The base 214 of the elevator shaft 210 may be positioned near the floor, such as ½ inch, of the vending machine. Elevator mechanism(s), including a motor (not shown), elevator screw shaft 216a and elevator guide shaft 216b, may be utilized to drive an elevator member, such as a cradle 218, which is configured to fit and move within the elevator shaft 210. In operation, a product (not shown) may exit the product store serpentine 204 via the exit 208 to enter into the elevator shaft 210 and onto the cradle 218. In one embodiment, the cradle 218 may be configured to tilt to accommodate an angular dispensing area (e.g., 45 degree dispensing area). A sensor (not shown) may be used to determine when a product item is in or supported by the cradle 218, and responsive to the sensor sensing that the cradle 218 does not have a product item, a next dispensing cycle may be performed. Electronics, such as a microprocessor, may be in communication with the sensor and elevator mechanism(s), and be configured to control dispensing operations. The sensor may be a light sensor, weight sensor, contact sensor, proximity sensor, or any other sensor capable of sensing and providing an indication as to whether or not a product item is within the cradle 218, whether the product storage serpentine 204 is empty or has a certain number of product items remaining, or otherwise. The elevator screw shaft 216a may drive the cradle 218 upward within the elevator shaft 210 to be released into a product dispensing area (see, for example, FIG. 1B). It should be understood that the elevator mechanisms, including the elevator screw shaft 216a, elevator guide shaft 216b, and/or cradle 218, may be any other elevator mechanism(s), such as a belt or other mechanisms, that provide for hoisting or otherwise moving product items to a product dispensing area.

The elevator shaft 210 has an acute angle relative to a base or floor 219 of the product storage area 202, and a product item is hoisted diagonally and above at least a portion of the product storage area 202 via the elevator shaft 210. Other elevator shaft configurations and orientations are possible (e.g., vertical or diagonally away from the product storage area 202), but having the elevator shaft 210 in the orientation presented, a more compact and stable vending mechanism may be provided. It should also be understood that rather than using the product storage serpentine 204 that may be limited to storing a single product type that multiple product storage serpentines or multiple angled shelves with multiple elevator entryways (see FIG. 2E), one at each shelf, may be used to store the same or different product types.

Figure 2B:
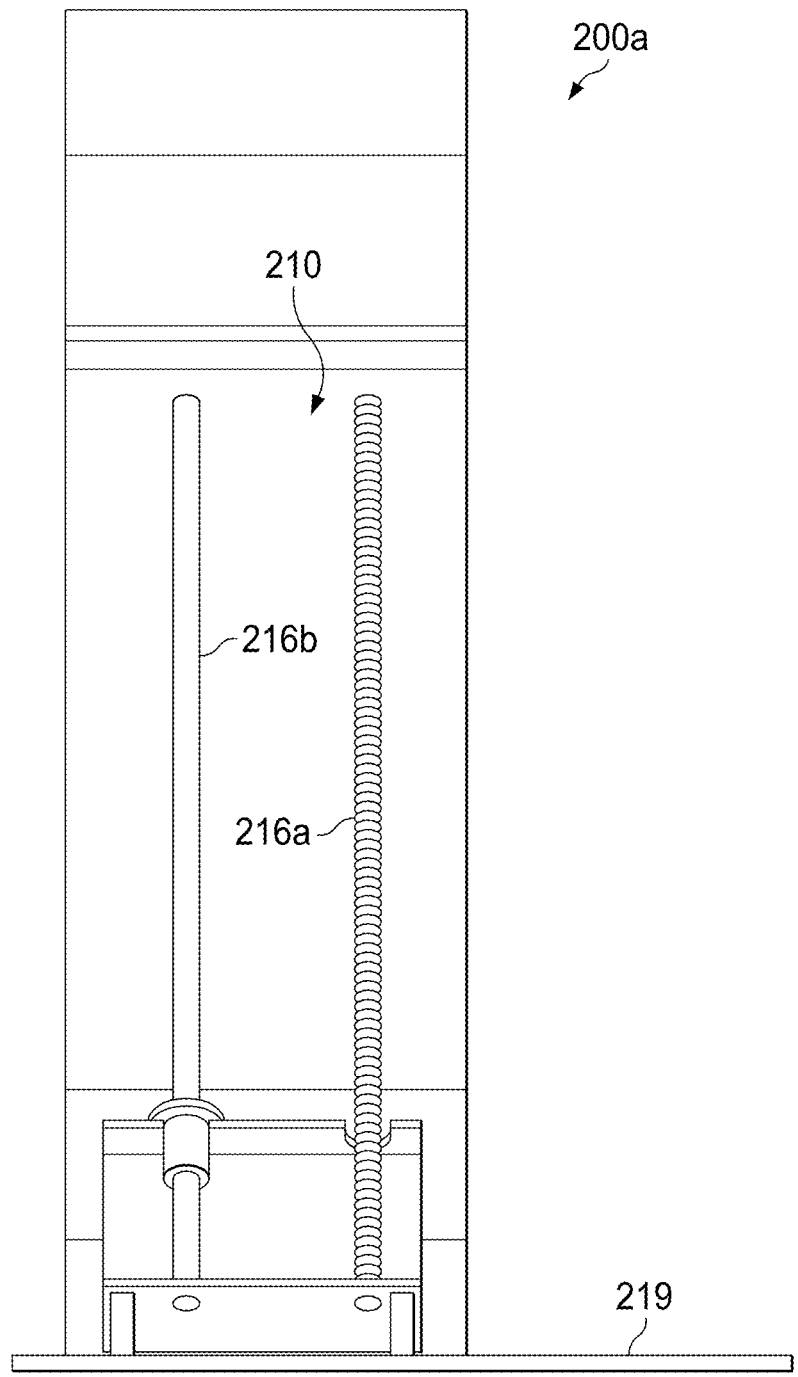
FIG. 2B is an illustration of a side view of the vending mechanism of FIG. 2A.

With regard to FIG. 2B, an illustration of a side view of the vending mechanism 200a of FIG. 2A is shown. The elevator screw shaft 216a and elevator guide shaft 216b are shown to extend along the elevator shaft 210. In this embodiment, a common wall 203b is shared between the product storage area 202 and elevator shaft 210. Other elevator configurations are envisioned.

Figure 2C:
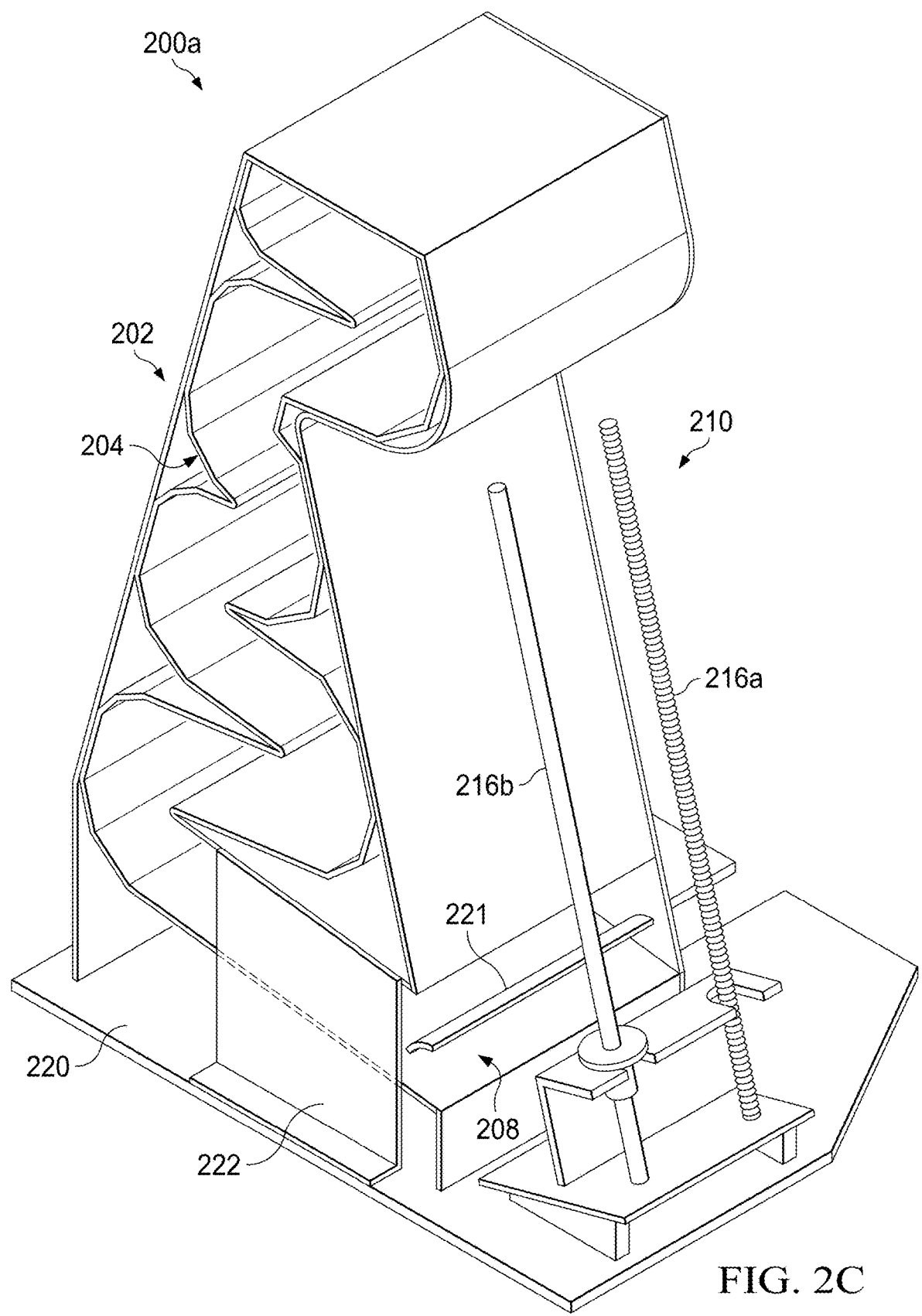
FIG. 2C is an illustration of a perspective view of the vending mechanism of FIG. 2A.

With regard to FIG. 2C, an illustration of a perspective view of the vending mechanism 200a of FIG. 2A is shown. The vending mechanism 200a is shown with the product storage serpentine 204. A movable stopper member (alternatively known as a gate or dam) 221 may be positioned at the exit 208 of the product storage serpentine 204 that, in an extended position, retains products in the product store serpentine 204, and, in a retracted position, enables a product to pass through the exit 208 of the product storage serpentine 204. A processing unit (not shown) in combination with position and/or proximity sensors (not shown) may synchronize the movable stopper member 221 with the position of the cradle 218 to ensure that a product item is released into the cradle 218 and not below the cradle 218. A base 220 may be used to mount the product storage serpentine 204. The vending mechanism 200a is modular in that it may be included in and removed from one or more vending machines. A bracket 222 along with fastening members (not shown) may be used to secure the product storage serpentine 204 to the base 220. Rather than using fastening members, adhesive or welding may be used to secure the product storage serpentine 204 to the base 220. Although the elevator shaft is shown without walls other than the wall 203b of the product storage area 202. It should be understood that walls that define the elevator shaft may be included or incorporated into a housing of the vending machine. Although not shown, multiple elevator shafts, such as one on each side of the product storage area 202, may be utilized to dispense one or more types of product items (e.g., different beverages, beverages and food, beverages and promotional items, etc.). In such a configuration, larger dimensions of the product storage area 202 may be utilized.

Figure 2D:
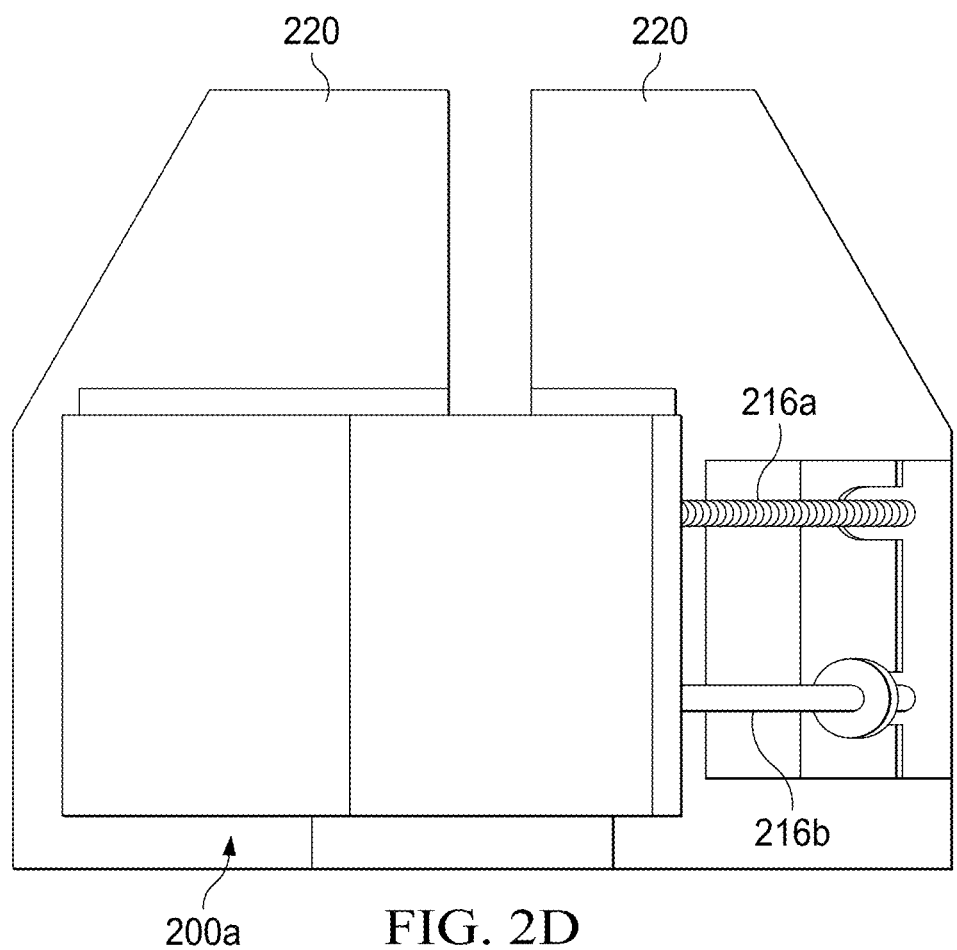
FIG. 2D is an illustrative of a top view of the vending mechanism of FIG. 2A.

With regard to FIG. 2D, an illustrative of a top view of the vending mechanism 200a of FIG. 2A is shown.

Figure 2E:
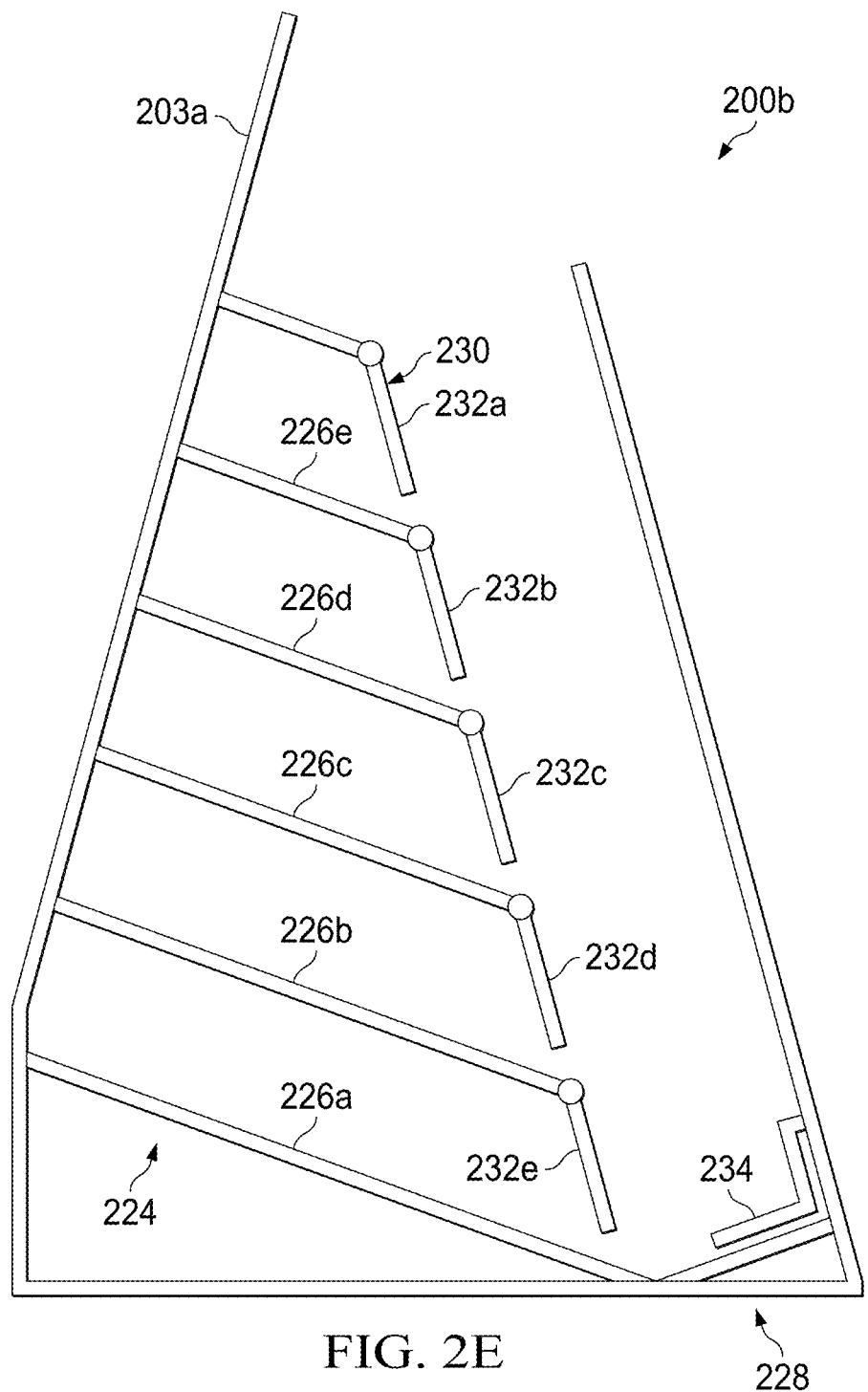
FIG. 2E is an illustration of an alternative illustrative embodiment of a vending mechanism configured to dispense multiple product types.

With regard to FIG. 2E, an illustration of an alternative illustrative embodiment of a vending mechanism 200b is shown. In this embodiment, rather than including a product storage serpentine 204 within a product storage area 224 of the vending mechanism 200a as shown in FIG. 2A, angled shelves 226a-226e (collectively 226) may be utilized to enable multiple types of product items to be loaded into and dispensed from the vending mechanism 200b. The use of the angled shelves 226 provides for a more limited number of product items to be dispensed, but supports different product types. It should be understood that the use of shelves for dispensing multiple types of items is illustrative and that alternative configurations of utilizing the product storage area 224 of the vending mechanism 200b may be possible. For example, multiple product storage serpentines may be used. Irrespective of the configuration of the storage members, in this case angled shelves 226, utilized for dispensing multiple types of product items, the elevator shaft 228 may include a wall 230 that forms multiple openings or doors 232a-232e (collectively 232) that enable product items to exit the product storage area 224 in which the angled shelves 226 are located. As an alternative to using doors 232, gates, such as those shown in FIG. 2F, may be utilized to meter the product items into the elevator shaft 228. A cradle 234 may be automatically adjusted within the elevator shaft 228 utilizing a controller and elevator mechanism(s) to be positioned from whichever of the doors 232 a product item is to dispensed. It should be understood that rather than using a cradle, other configurations of elevator members configured to hoist or lift a product item may be utilized.

Figure 2F:
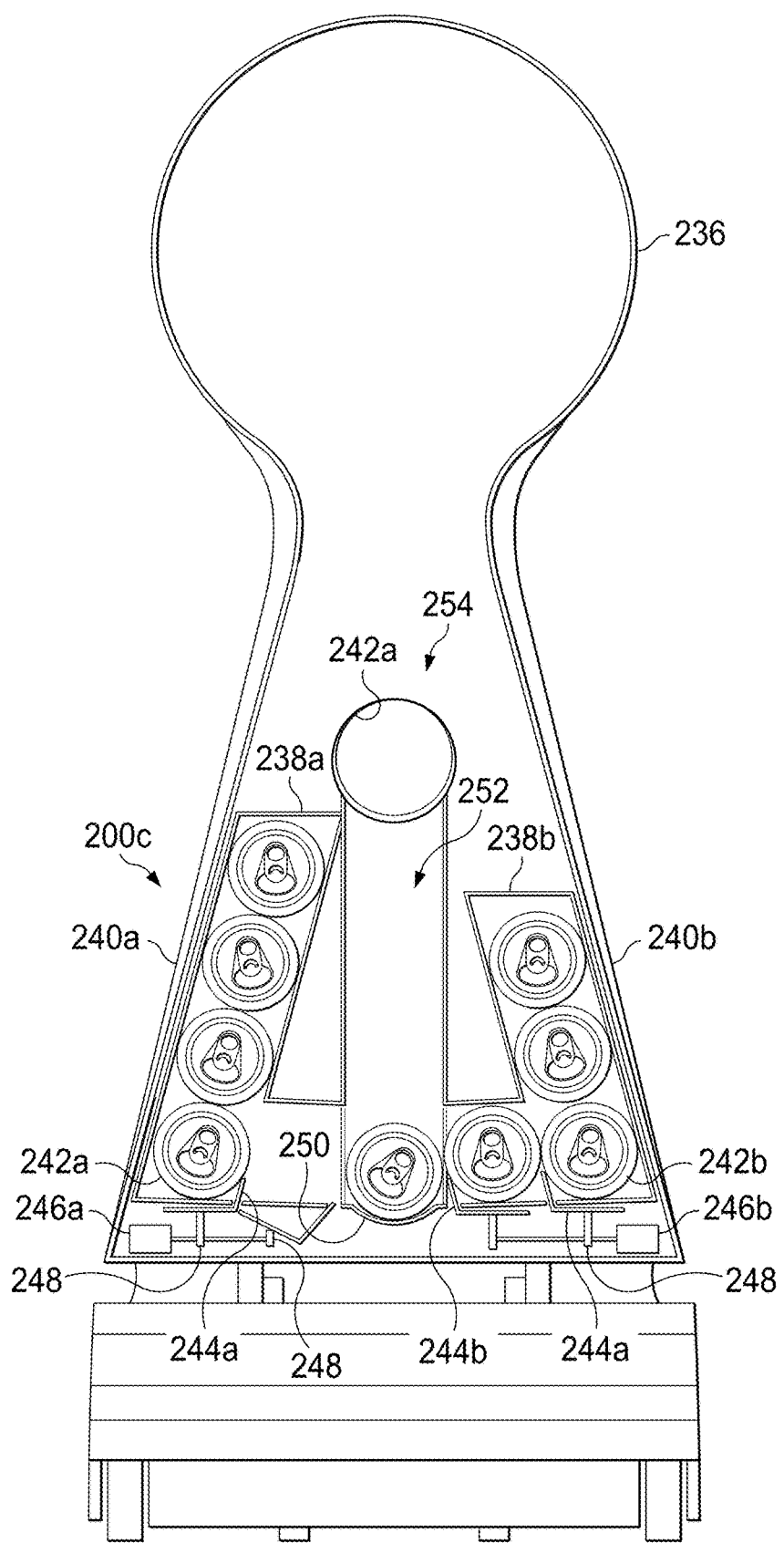
FIG. 2F is an illustration of another illustrative vending mechanism that operates within a vending machine.

With regard to FIG. 2F, an illustration of another illustrative vending mechanism 200c that operates within a vending machine 236 is shown. The vending mechanism 200c may include a first product pathway 238a and second product pathway 238b (collectively 238) positioned on respective sides of the vending machine 236. Although shown as different lengths, it should be understood that the product pathways 238 may be identical lengths. Moreover, the lengths may extend upwards along each sidewall 240a and 240b as much as possible so as to maximize storage capacity of product items 242a and 242b (collectively 242). In one embodiment, the product items 242a and 242b are the same. Alternatively, the product items 242a and 242b are different. As an example, the product items 242a may be cans of a first beverage type, and the product items 242b may be cans of a second beverage type.

To dispense the product items 242, gates 244a and 244b that include servos 246a and 246b to control cams 248 may be utilized to release the product items 242 into a cradle 250. The cradle 250 may be hoisted upward via an elevator shaft 252 to a dispensing area 254. As shown, multiple cams 248 may be utilized for moving each of the product items 242a and 242b. It should be understood that alternative number of cams 248 may be utilized. Alternatively, different mechanism(s) may be utilized for metering or moving the product items 242 into the cradle 250. In one embodiment, an operator may select which of the product items 242a or 242b to deliver. Alternatively, the user may select which of the product items 242a or 242b to deliver to the user by performing an action (e.g., performing a physical action, such as raising a left or right hand, shaking a left or right hand of vending machine 236, moving left or right, or otherwise).

With regard to FIGS. 3A-3D, illustrations of an illustrative vending machine 300 inclusive of a housing 302 and vending mechanism 304 is shown. The vending machine 300 is shown to include wheels 306a-306d (collectively 306) that may be driven by a drive mechanism (not shown), such as a motor. The four wheels 306 include (i) two wheels 306b and 306c in the front and (ii) two wheels 306a and 306d in the rear of the vending machine 300. Alternative number of wheels and configurations may be utilized to enable the vending machine to be mobile or self-propelled. In one embodiment, a first motor (not shown) may drive the rear wheels 306a and 306d, and a second motor (not shown) may control angles of the front wheels 306b and 306c. The vending machine 300 may be locally controlled by a wired controller, remotely controlled by a local wireless channel (e.g., Wi-Fi®, Bluetooth®, RF, or any other short range communications path), or remotely controlled by a wireless communications channel, such as a mobile communications channel. A controller may be configured to cause the vending machine 300 to move and travel in a desired direction. The controller may be a specialized electronic device or a mobile electronic device, such as a mobile telephone, configured with a mobile app executed by the mobile electronic device that communicates with the vending machine 300 to control motion and, optionally, operation of the vending machine 300.

Figure 7A:
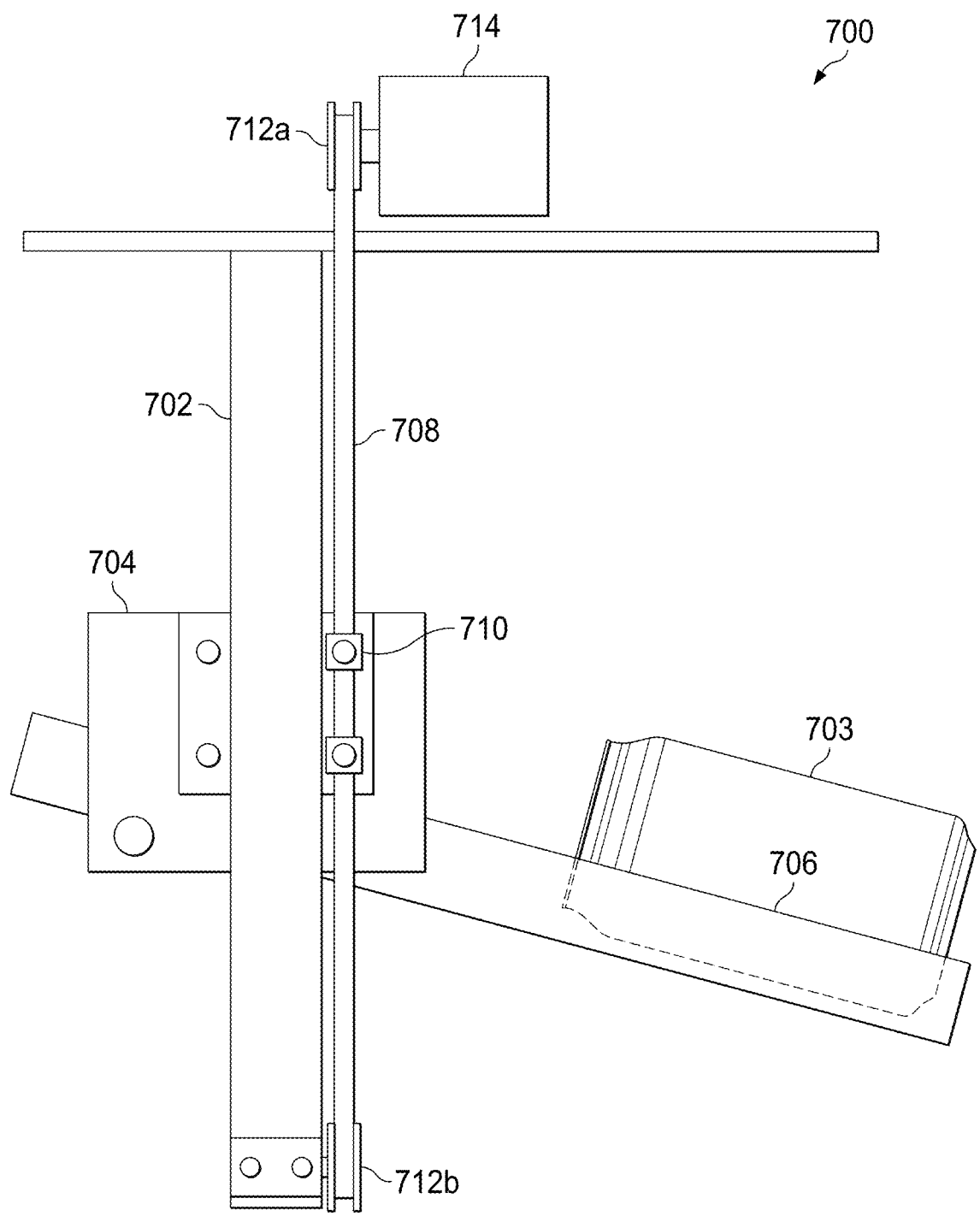
FIGS. 7A and 7B are illustrations of an illustrative elevator drive system.
Figure 7B:
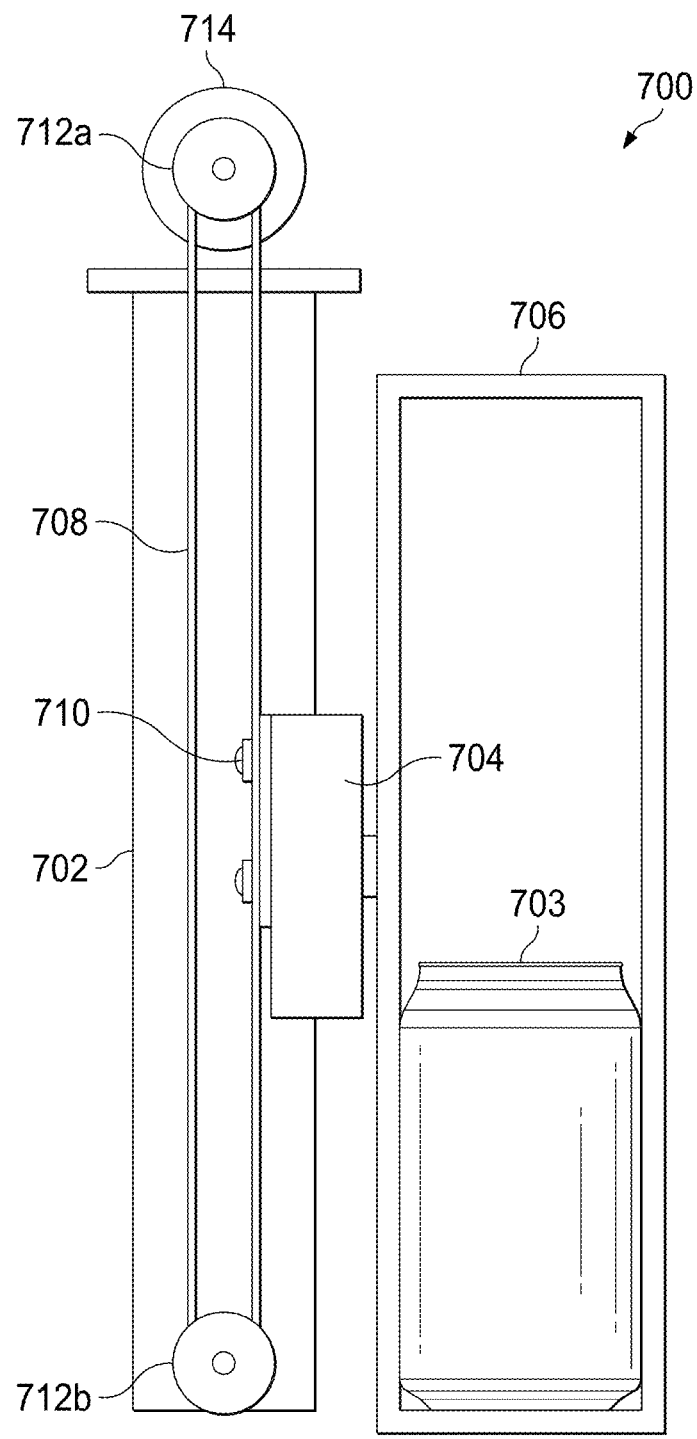

With regard to FIGS. 7A and 7B, illustrations of an illustrative elevator drive system 700 are shown. The elevator drive system 700 is shown to include a guide rail 702 that is fixedly mounted within a vending machine (see, for example, vending machine 236 of FIG. 2F) to provide stability for lifting and dispensing a product item 703. A carriage 704 may be configured to support a cradle 706 on which the product item 703 is supported to be dispensed. A belt 708 may be utilized to provide vertical or any other directional motion for the carriage 704, where the carriage 704 is connected to the belt 708 via belt/carriage, connectors 710. The belt 708 may be engaged to pulleys 712a and 712b that allow for the belt to move upwards and downwards by a causing rotation of the pulley 712a, as understood in the art. The motor 714 may be a low RPM motor that is driven in one direction to lift the product item 703 for dispensing, and reversed to lower the cradle for receiving a next product item to be dispensed. The motor 714 may be any type of motor, including a direct drive motor, electromechanical motor, hydraulic motor, pneumatic motor, or any other motor, as understood in the art.

Figure 8:
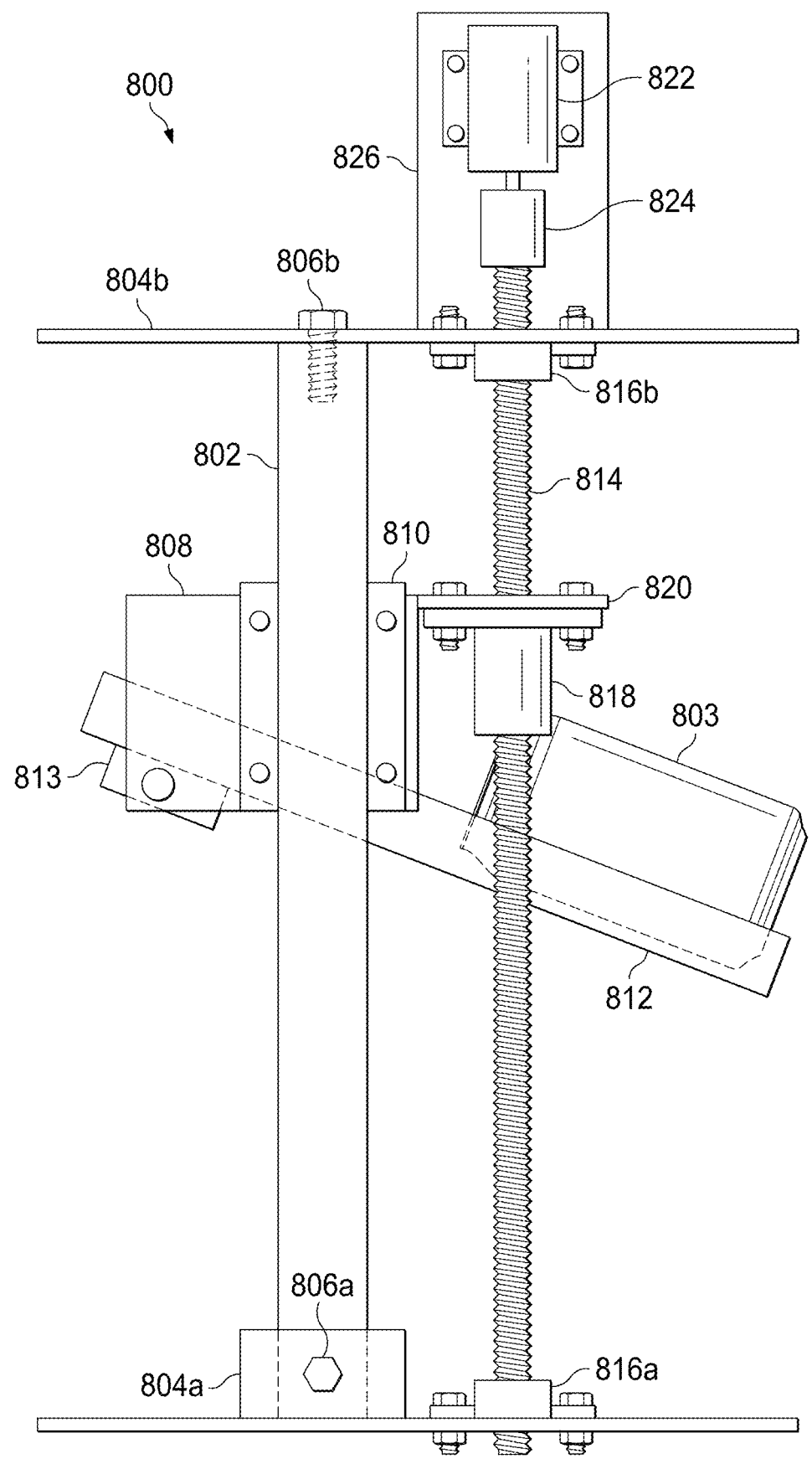
FIG. 8 is an illustration of an alternative illustrative elevator drive system.

With regard to FIG. 8, an illustration of an alternative illustrative elevator drive system 800 is shown. A guide rail 802 may be fixedly positioned within a vending machine, such as vending machine 236 of FIG. 2F, to provide stability for lifting and dispensing a product item 803, in this case, a beverage can. The guide rail 802 may be secured to the vending machine via mounting brackets 804a and 804b along with fastening members 806a and 806b, such as screws, bolts, or otherwise. Alternative hardware or fastening configurations (e.g., welds, adhesives, etc.) may be utilized to fixedly positioned the guide rail 802 in the vending machine. A carriage 808 may be slidably engaged to the guide rail 802 via a carriage connector 810. A cradle 812 may be connected to the carriage 808 via a cradle/carriage connector 813.

To provide for vertical or angular motion of the cradle 812, a lead screw 814, as understood in the art, may be supported by bearings 816a and 816b that enables the lead screw 814 to be rotated. A ball nut 818 may be configured to convert rotational motion of the lead screw 814 into linear motion to move the cradle 812 carrying the product item 803 from a first position to a second position to dispense the product item 803. An attachment member or portion of the ball nut 818 may be configured to attach the ball nut 818 to the carriage 808, as shown. A motor 822 may be coupled to the lead screw 814 via a coupler 824, thereby causing rotation of the motor 822 to drive the lead screw 814. A mounting bracket 826 may be configured to mount the motor to the mounting bracket 804b. Alternative mounting configurations for the motor 822 may be utilized. The motor 822 may be electromechanical, as understood in the art. Alternatively, the motor 822 may utilize any other motor type, such as hydraulic, pneumatic, or otherwise. Utilizing the elevator drive system 800 with a direct drive configuration with the lead screw 814 eliminates the use of the elevator drive system 700 with the belt 708 of the FIG. 7. Although the elevator drive systems of FIGS. 7 and 8 provide for belt and screw drive mechanisms, it should be understood that alternative drive mechanisms may be utilized to move a product item from a first position to a second position for dispensing the product item from a mobile or fixed-position vending machine.

Figure 4:
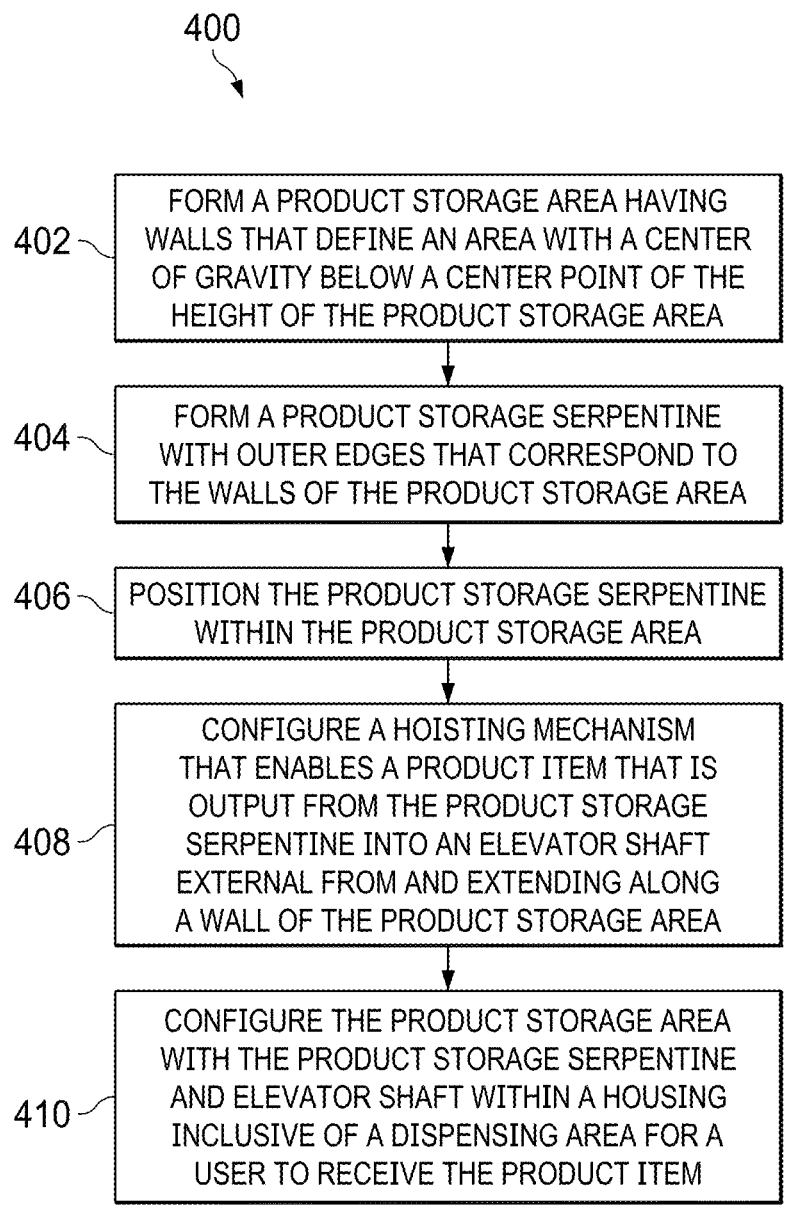
FIG. 4 is a flow diagram of an illustrative process for manufacturing a vending machine.

With regard to FIG. 4, a flow diagram of an illustrative process for manufacturing a vending machine is shown. The process 400 may start at step 402, where the product storage area having walls that define an area with a center-of-gravity below a center point of the height of the product storage area is formed. In one embodiment, the walls are aligned at acute angles. As an example, the walls may have an approximately 75 degree acute angle relative to a floor of the product storage area. In one embodiment, the walls are separated at a distance that enables a product item to pass between the walls. The closest point of the walls may be formed by a top of one wall relative to a point along a second wall (see FIG. 2A, for example). At step 404, a product pathway, such as a storage serpentine, with outer edges that extend to the walls of the product storage area may be formed. If the product pathway is a product storage serpentine, the product storage serpentine may wind between the walls such that the outer edges of the product storage serpentine extends between the walls that define the product storage area. The product storage serpentine may have rounded or angled corners, and each of the straight sections may have a downward slope so that product items within the product storage serpentine are gravitationally directed downward through the product storage serpentine. In one embodiment, the slope of a straight areas of the product storage serpentine may range from approximately 3 degrees to approximately 7 degrees. It should be understood, however, that alternative downward slope and angles may be utilized to enable product items to gravitationally flow through the product storage serpentine.

At step 406, the product storage serpentine may be positioned within the product storage area. In positioning the product storage serpentine within the product storage area, fastening members and/or adhesives may be utilized to secure the product storage serpentine within the product storage area. At step 408, a hoisting mechanism that enables a product item that is output from the product storage serpentine into an elevator shaft external from and extending along a wall of the product storage area may be configured. In one embodiment, the hoisting mechanism may include an elevator screw shaft, an elevator guide shaft, and a cradle that contacts or engages a product item that exits from the product storage serpentine and hoists the product item along the elevator shaft and outside of a wall of the product storage area. At step 410, the product storage area with the product storage serpentine and elevator shaft may be configured within a housing inclusive of a dispensing area for a user to receive the product item. The dispensing area may include an opening defined by the housing and include a catch or receiver region, such as a basket, into which a product item may be positioned after being released from the elevator shaft.

Figure 5:
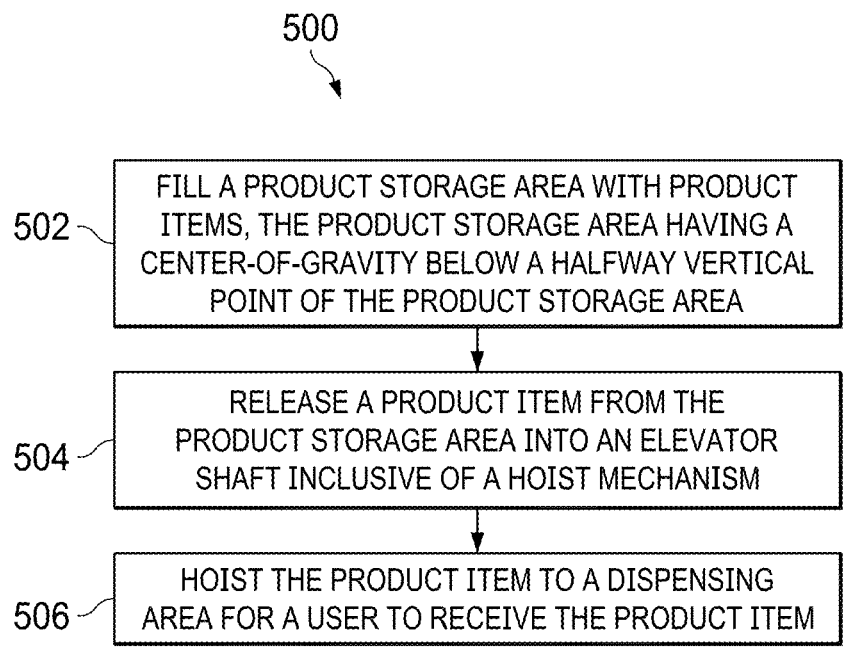
FIG. 5 is a flow diagram of an illustrative process for operation of a vending machine.

With regard to FIG. 5, a flow diagram of an illustrative process 500 for operation of a vending machine is shown. The process 500 may start at step 502, where a product storage area may be filled with product items (e.g., individual packages of products that may be individually dispensed to a user). The product storage area may have a center-of-gravity below a halfway vertical point of the product storage area. At step 504, a product item may be released from the product storage area into an elevator shaft inclusive of a hoisting mechanism. At step 506, the product item may be hoisted to a dispensing area for a user to receive the product item. In hoisting the product item, the product item may be hoisted diagonally along an outside of the product storage area.

Figure 6:
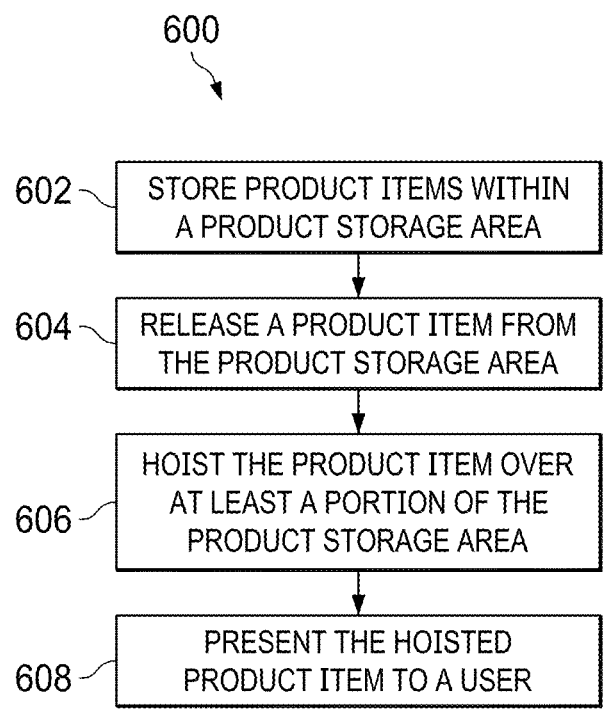
FIG. 6 is a flow diagram of an alternative illustrative process for operation of a vending machine.

With regard to FIG. 6, a flow diagram of an alternative illustrative process 600 for operation of a vending machine is shown. The process 600 may start at step 602, where product items may be stored in a product storage area. The product storage area may have a center-of-gravity below a halfway vertical point of the product storage area. At step 604, a product item may be released from the product storage area. In one embodiment, the product item is released into an elevator shaft inclusive of a hoisting mechanism. At step 606, the product item may be hoisted over at least a portion of the product storage area. In hoisting the product item, the product item may be hoisted diagonally along an outside of the product storage area. At step 608, the hoisted product item may be presented to a user for taking away from the vending machine. The hoisting mechanism may be synchronized with a metering device that enables and disables product items to be released from the product storage area into the elevator shaft such that an elevator member of the hoisting mechanism is at or below an entranceway of the elevator shaft to receive the product item to be hoisted.

The foregoing method descriptions and flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A vending machine, comprising:
   a housing;
   a product storage area in which product items to be dispensed by the vending machine are stored;
   an elevator shaft positioned adjacent to said product storage area, and having an acute angle relative to a base of said product storage area and towards said product storage area;
   an elevator member configured to hoist a product item along said elevator shaft;
   a drive mechanism configured to cause said elevator member to move from a first position to a second position along the elevator shaft to hoist the product item;
   an opening defined by the housing, and configured to enable the product item to be received by a user, and
   a plurality of wheels, and an additional drive mechanism configured to rotate at least one of the wheels to cause the vending machine to be self-propelled.

2. The vending machine according to claim 1, further comprising a product storage serpentine disposed within said product storage area, and having an exit at said elevator shaft, said product storage serpentine further configured to enable the product items to be gravitationally guided through said product storage area and inserted into an opening of said elevator shaft.

3. The vending machine according to claim 2, wherein said product storage serpentine is configured to support multiple sizes of product items.

4. The vending machine according to claim 2, wherein a bottom portion of said product storage serpentine has an angle that causes a product item with a circular perimeter to roll toward the opening of said elevator shaft.

5. The vending machine according to claim 2, wherein at least a portion of said product storage serpentine extends above a top surface of said elevator shaft.

6. The vending machine according to claim 1, wherein said product storage area and said elevator shaft share a common wall.

7. The vending machine according to claim 1, wherein said housing includes a left wall, a right wall, and a bottom surface, the left and right walls having acute angles relative to the bottom surface.

8. The vending machine according to claim 7, wherein said product storage area includes a left wall, a right wall, and a bottom surface, the left and right walls having acute angles relative to the bottom surface.

9. The vending machine according to claim 8, wherein the acute angles are approximately 75 degrees.

10. The vending machine according to claim 1, wherein the vending machine has a robotic appearance.

* * * * *